United States Patent [19]
Jang et al.

[11] Patent Number: 5,507,706
[45] Date of Patent: Apr. 16, 1996

[54] HYDRAULIC CONTROL SYSTEM OF AUTOMATIC TRANSMISSION FOR VEHICLE

[75] Inventors: Jaeduk Jang; Kibeen Lim, both of Kyungki-do, Rep. of Korea

[73] Assignee: Hyundai Motor Company, Seoul, Rep. of Korea

[21] Appl. No.: 347,312

[22] Filed: Nov. 30, 1994

[51] Int. Cl.⁶ ................................................ F16H 61/26
[52] U.S. Cl. .......................... 477/130; 477/126; 477/131; 477/138; 477/156
[58] Field of Search .................................... 477/126, 130, 477/131, 138, 156, 166, 168, 169, 62, 64; 475/116, 119, 120, 121, 122, 123, 127

[56] References Cited

U.S. PATENT DOCUMENTS

| | | | |
|---|---|---|---|
| 4,776,240 | 10/1988 | Miki . | |
| 4,870,877 | 10/1989 | Hasegawa et al. . | |
| 4,890,515 | 1/1990 | Taniguchi et al. | 477/152 X |
| 5,003,842 | 4/1991 | Hatta et al. . | |
| 5,131,298 | 7/1992 | Marusue . | |
| 5,133,230 | 7/1992 | Ito et al. . | |
| 5,337,625 | 8/1994 | Jang | 477/142 X |
| 5,367,922 | 11/1994 | Jan | 74/732.1 |
| 5,375,483 | 12/1994 | Kim et al. | 74/730.1 |

FOREIGN PATENT DOCUMENTS

| | | |
|---|---|---|
| 0162352 | 11/1985 | European Pat. Off. . |
| 2176256 | 7/1990 | Japan . |
| 9415809 | 7/1994 | WIPO . |
| 9500353 | 1/1995 | WIPO . |

*Primary Examiner*—Charles A. Marmor
*Assistant Examiner*—Peter Kwon
*Attorney, Agent, or Firm*—Birch, Stewart, Kolasch & Birch

[57] ABSTRACT

A hydraulic control system of the present invention is provided for improving a responsiveness to a speed change by compleating the speed chang with a torque pressure control hydraulic pressure after initiating the speed change with the drive hydraulic pressure. The hydraulic control system includes an oil pump for generating hydraulic pressure, a pressure regulating valve for regulating the hydraulic pressure to be proper pressure for reverse and drive, five friction elements which receive the hydraulic pressure for drive in accordance with operation of a manual valve, two friction elements which receive the hydraulic pressure for reverse in accordance with operation of the manual valve, first and second shift control parts having at least two shift valves, respectively, to supply the hydraulic pressure to the friction elements, and a torque control hydraulic pressure regulating part for supplying a torque control hydraulic pressure to the first and second shift control parts.

28 Claims, 21 Drawing Sheets

| RANGE | | 78 | 52 | 64 | 70 | F1 | F2 | F3 | F4 | 80 | 34 | 58 | 74 | 82 | ENGINE BRAKE |
|---|---|---|---|---|---|---|---|---|---|---|---|---|---|---|---|
| P | | X | X | X | X | X | X | X | X | X | X | X | X | X | X |
| R | | O | X | X | X | X | O | X | O | X | X | X | O | O | O |
| N | | X | X | X | X | X | X | X | X | X | X | X | X | O | X |
| D | 1 | X | X | X | X | O | O | X | O | X | O | X | X | O | X |
| D | 2 | X | O | X | X | O | X | O | O | X | O | X | X | O | X |
| D | 3 | X | O | X | X | O | X | X | O | X | O | O | X | O | X |
| D | 4 | X | O | O | X | X | X | X | O | X | O | O | X | O | O |
| D | 5 | X | O | O | O | X | X | X | X | X | O | O | X | X | O |
| D | 1 | X | X | X | X | O | O | X | O | X | O | X | X | O | X |
| D | 2 | X | O | X | X | O | X | O | O | X | O | X | X | O | X |
| D | 3 | X | O | X | X | O | X | X | O | X | O | O | X | O | X |
| D | 4 | X | O | O | X | X | X | X | O | X | O | O | X | O | O |
| 3 | 1 | X | X | X | X | O | O | X | O | O | O | X | X | O | X |
| 3 | 2 | X | O | X | X | O | X | O | O | O | O | X | X | O | X |
| 3 | 3 | X | O | X | X | O | X | X | O | O | O | O | X | O | O |
| 2 | 1 | O | X | X | X | O | O | X | O | O | O | X | X | O | O |
| 2 | 2 | X | O | O | X | O | X | X | O | O | O | X | X | O | O |
| L | | O | X | X | X | O | O | X | O | O | O | X | X | O | O |

NOTE:  O : ENGAGEMENT OF FRICTION ELEMENT

X : DISENGAGEMENT OF FRICTION ELEMENT

FIG. 18

HYDRAULIC CONTROL SYSTEM OF AUTOMATIC TRANSMISSION FOR VEHICLE

BACKGROUND OF THE INVENTION

1. Field of the Invention

The present invention relates to a hydraulic control system of an automatic transmission for a vehicle and, more particularly, to the hydraulic control system which can improve shift feeling and fuel consumption ratio by permitting a 5-speed change to be realized and a line pressure to be variably controlled.

2. Description of Related Art

Generally, a conventional automatic transmission for a vehicle includes a torque converter, a multi-stage shift gear mechanism connected to the torque converter, and a plurality of friction elements, which are actuated by hydraulic pressure, for selecting one of the gear stages of the shift gear mechanism.

The hydraulic pressure pressurized by an oil pump is supplied to the friction elements and a plurality of control valves.

The torque converter includes a pump impeller connected to an output shaft of an engine to rotate therewith, a turbine runner connected to an input shaft of the transmission to operate therewith, and a stator located between the pump impeller and the turbine runner.

Automatic speed change is realized by a planetary gear unit operated by the friction elements such as clutches or a kick-down band brake.

The friction elements are selectively actuated by the valves of the hydraulic control system which change the direction of the hydraulic pressure. A manual valve is designed to receive the hydraulic pressure from the oil pump through a port, which is closed or opened in accordance with position of a shift lever, and connected to a shift control valve by a passage to supply the hydraulic pressure thereto.

Such an automatic transmission for vehicle is disclosed in U.S Pat. No. 5,003,842.

SUMMARY OF THE INVENTION

Therefore, the present invention has been made in an effort to solve the above-described problems.

It is an object of the present invention to provide a hydraulic control system which can reduce the shift impact by completing the speed change with the drive hydraulic pressure after initiating the speed change with the torque control hydraulic pressure.

It is another object of the present invention to provide a hydraulic control system of an automatic transmission for vehicle which can provide a 5-speed.

It is a further object of the present invention to provide a hydraulic control system of an automatic transmission for vehicle, which can skip the speed ratio to improve the response to the speed change.

It is steel another object of the present invention to provide a hydraulic control system which has an advantage of improving the shift feeling as well as the fuel consumption ratio by properly controlling the line pressure in accordance with the travelling condition to minimize the drive loss of the oil pump.

To achieve the objects, the present invention provides a hydraulic control system of an automatic transmission for a vehicle, comprising: an oil pump for generating a hydraulic pressure; a pressure regulating valve for receiving the hydraulic pressure from the oil pump and for properly regulating the hydraulic pressure at drive "D" or reverse "R" ranges; a torque converter, which includes a damper clutch valve, for transmitting driving power from an engine to an input shaft of the transmission; a converter clutch regulator valve for supplying the hydraulic pressure to the damper clutch to actuate the damper clutch; a solenoid supply valve for reducing and supplying the hydraulic pressure, which is regulated at the pressure regulating valve, to first, second, third, fourth, fifth, sixth and seventh solenoid valves; a first friction element which is actuated at all speed ratios and second, third, fourth, fifth, sixth, seventh and eight friction elements more than one of which is actuated at each speed ratio; a torque control regulator valve for converting the hydraulic pressure into a torque control hydraulic pressure for actuating the friction elements for each speed ratio; a control switch valve for receiving the torque control hydraulic pressure from the torque control regulator valve and for changing a flowing direction of the torque control hydraulic pressure; first-second, second-third, third-fourth, and fourth-fifth speed shift valves for selectively supplying the torque control hydraulic pressure supplied from the control switch valve or a drive hydraulic pressure regulated by the pressure regulating valve to the friction elements for each speed ratio in accordance with ON/OFF operation of the first, second and third solenoid valves to change the speed ratio; second speed clutch, third speed clutch, a fourth speed band, and an overdrive unit valves, all of which are controlled by the torque control hydraulic pressure and the drive hydraulic pressure, for supplying the hydraulic pressure to the friction elements for each speed ratio and the shift valves; and a manual valve for supplying the hydraulic pressure regulated by the pressure regulating valve to the shift valves or a reverse friction element.

The reverse friction element is directly connected to the manual valve via a reverse pressure passage to receive the hydraulic pressure in accordance with a position of a shift lever.

The system further comprises a reverse clutch inhibitor valve for preventing the vehicle from reversing by interrupting the hydraulic pressure which is supplied to the sixth friction element when the shift lever is shifted to a reverse "R" range during driving, the inhibitor valve being mounted on the reverse pressure passage.

The torque control regulator valve comprises a pressure detecting chamber to which the hydraulic pressure is supplied in accordance with the seventh solenoid valve controlled with duty ratio; a valve plug on which the hydraulic pressure within the pressure detecting chamber acts; a valve spool for selectively control the torque control hydraulic pressure which is supplied to the control switch valve; a first elastic member which is located between the valve spool and the valve plug to elastically support the valve spool and the valve plug; and a second elastic member, which has a smaller elastic force than that of the first elastic member, for elastically supporting the valve spool.

The torque control regulator valve is connected to the control switch valve via a first torque control hydraulic pressure passage and the torque control switch valve is connected to the first-second speed shift valve via second and third torque control hydraulic pressure passages to selectively supply the hydraulic pressure to the first-second speed shift valve in accordance with ON/OFF operation of the solenoid valve.

The first-second speed shift valve is provided with the first and second ports for selectively receiving the torque control hydraulic pressure; a third for directly receiving the drive hydraulic pressure from the manual valve port; a fourth port for supplying the torque control hydraulic pressure of the first port to the second-third speed shift valve; a fifth port for supplying the torque control hydraulic pressure of the second port to the second-third speed shift valve; and a sixth port for receiving the drive hydraulic pressure from the manual valve through the third port or for supplying the torque control hydraulic pressure of the first port to the second speed clutch valve, and the first-second speed shift valve comprises a valve spool for selectively opening the ports.

The second-third speed shift valve is provided with first and second ports for respectively receiving the hydraulic pressure from the first-second speed shift valve; a third port for receiving the hydraulic pressure from the second speed clutch valve; fourth and fifth ports for supplying the torque control hydraulic pressure flowing into through the first and second ports to the third-fourth speed shift valve; and a sixth port for supplying the torque control hydraulic pressure or the drive hydraulic pressure supplied from the third port to the third speed clutch valve, and the second-third speed shift valve comprises a valve spool for selectively opening the ports.

The third-fourth speed shift valve is provided with first and second ports for respectively receiving the hydraulic pressure from the second-third speed shift valve; a third port for receiving the hydraulic pressure from the third speed clutch valve, fourth and fifth ports for respectively supplying the torque control hydraulic pressure flowing into through the first and second ports to the fourth-fifth speed shift valve; and a sixth port for supplying the hydraulic pressure of the first and third ports to the fourth speed band valve, and the third-fourth speed shift valve comprises a valve spool for selectively opening the ports.

The fourth-fifth speed shift valve is provided with first and second ports for receiving the hydraulic pressure from the third-fourth speed shift valve; a third port for receiving the hydraulic pressure from the fourth speed band valve; and a fourth for supplying the hydraulic pressure to the overdrive unit valve, and the fourth-fifth speed shift valve comprises a valve spool for selectively opening the ports.

The first-second speed shift valve comprises first and second pressure detecting chambers, the second-third speed shift valve comprises a third pressure detecting chamber, the third-fourth speed shift valve comprises a fourth pressure detecting chamber, and the fourth-fifth speed shift valve comprises a fifth pressure detecting chamber, wherein the hydraulic pressure within the third pressure detecting chamber is controlled by the first solenoid valve, each hydraulic pressure of the first and fourth pressure detecting chambers is controlled by the second solenoid valve, and each hydraulic pressure of the second and fifth pressure detecting chambers is controlled by the third solenoid valve, whereby the torque control hydraulic pressure and the drive hydraulic pressure is supplied to the friction elements for each speed ratio in due sequence.

The manual valve comprises parking "P" reverse "R", neutral "N" drive "D", "3", "2", and low "L" ranges.

The manual valve is constituted such that a manual transmission between the drive "D", "3", "2" and low "L" ranges is possible.

The drive hydraulic pressure is directly supplied to the first and eight friction element at the first speed of the drive "D" range.

At the second speed of the drive "D" range, the third solenoid valve, which controls the first-second speed shift valve, is controlled to be turned OFF to supply the drive hydraulic pressure to the second friction element as well as the first and eighth friction elements which actuate at the first speed of the drive "D" range.

At the third speed of the drive "D" range, the first solenoid valve, which controls the second-third speed shift valve, is controlled to be turned OFF to supply the drive hydraulic pressure to the third friction element as well as the first, second and eighth friction elements which actuate at the second speed of the drive "D" range.

At the fourth speed of the drive "D" range, the second valve, which controls the third-fourth speed shift valve, is controlled to be turned ON to supply the drive hydraulic pressure to the fourth friction element as well as the first, second, third and eighth friction elements which actuate at the third speed of the drive "D" range.

At the fifth speed of the drive "D" range, the third solenoid valve, which controls the first-second speed shift valve, is controlled to be turned ON to interrupt the hydraulic pressure which is supplied to the eighth friction element and to supply the drive hydraulic pressure to the fifth friction element as well as the first, second, third and fourth friction elements which actuate at the fourth speed of the drive "D" range.

The solenoid supply valve comprises an elastic member, a valve spool elastically supported by the elastic member, and a screw for compressing and expanding the elastic member to regulate the hydraulic pressure.

The second detecting chamber of the first-second speed shift valve is connected to the second and third solenoid valve through first and second passages, respectively, and a shuttle valve is mounted on a connecting portion of the first and second passages to provide a skip shift.

When the speed ratio is skip-shifted from the second speed to the fourth speed skip, the first and second solenoid valves which control the second-third and third-fourth speed shift valves, respectively, are controlled to be turned on and the third solenoid valve which controls the fourth-fifth and first-second speed shift valves is controlled to be turned OFF, such that the drive hydraulic pressure is supplied to the first, second, and eight friction elements and the torque control hydraulic pressure is supplied to the third and fourth friction elements.

When the speed ratio is skip-shifted from the second speed to the fifth speed, the first, second, third solenoid valves are controlled to be turned ON such that the drive hydraulic pressure is supplied to the first and second friction elements and the torque control hydraulic pressure is supplied to the third, fourth and fifth friction elements.

When the speed ratio is skip-shifted from the third speed to the fifth speed, the first and second solenoid valve which control the second-third speed shift and third-fourth speed shift valves, respectively, are controlled to be turned OFF and the third solenoid valve, which controls the fourth-fifth and first-second speed shift valves, is controlled to be turned ON, such that the drive hydraulic pressure is supplied to the first, second and third friction element and the torque control hydraulic pressure is supplied to the fourth and fifth friction elements.

BRIEF DESCRIPTION OF THE DRAWINGS

FIG. 18 is a table illustrating an operating sequence of friction elements at each speed ratio of the power train for the automatic transmission according to the present invention.

DETAILED DESCRIPTION OF THE INVENTION

The present invention will become apparent from the following description in conjunction with the attached drawings.

Figure 1:
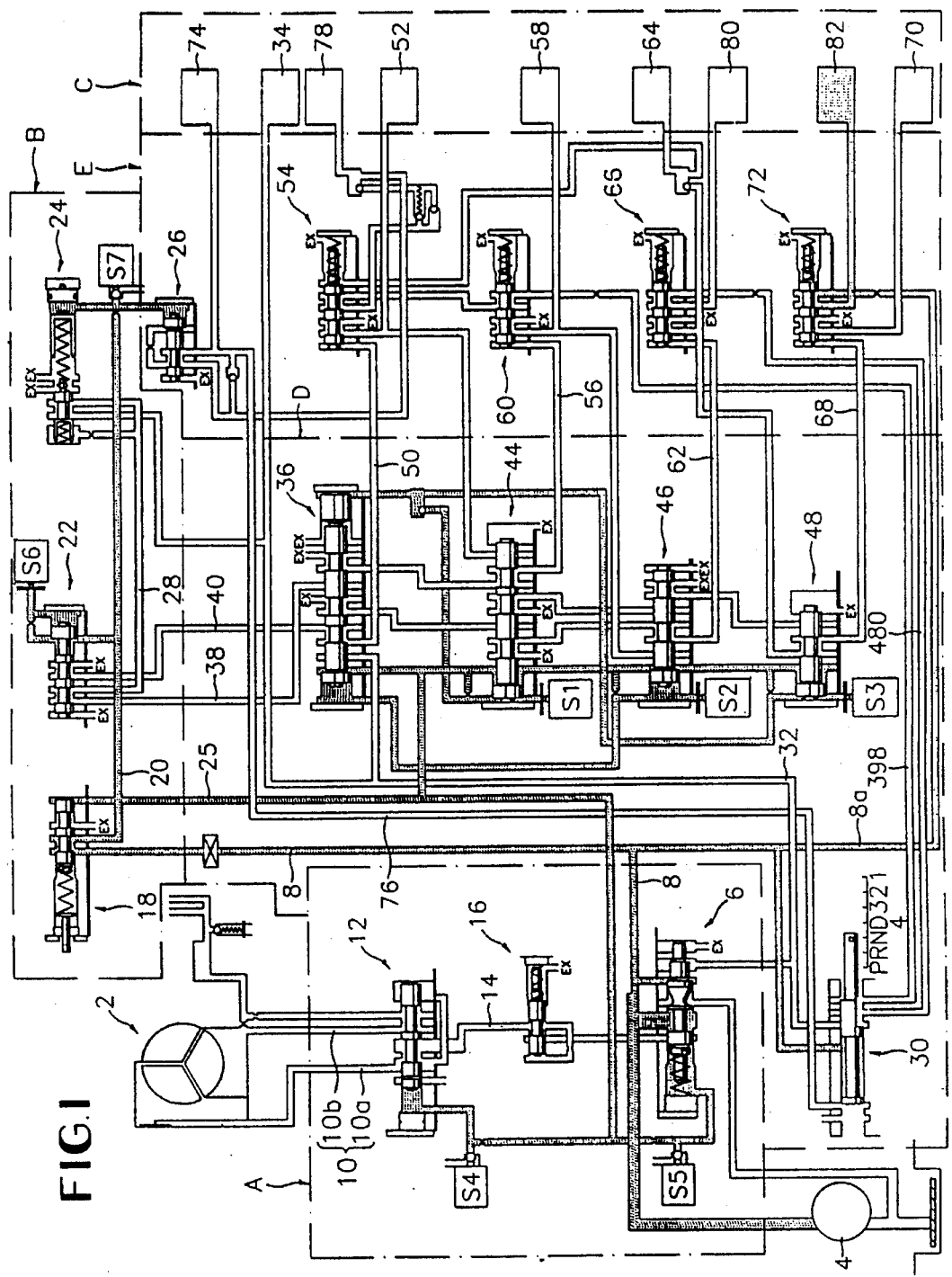
FIG. 1 is a hydraulic circuit diagram showing a formation of the hydraulic pressure at a neutral "N" range of a hydraulic control system for an automatic transmission according to the present invention.

FIG. 1 shows a hydraulic control system according to the present invention when a shift lever is selected at a neutral "N" range.

The hydraulic control system includes a torque converter 2 located between a crankshaft of an engine and a transmission system to transmit power, an oil pump 4 having a drive gear mounted on a pump drive hub of the torque converter 2 rotating therewith and a drive gear being in mesh with the drive gear, a damper clutch control part A for selectively actuating a damper clutch of the torque converter 2 by varying hydraulic pressure generated from the oil pump 4, a torque control hydraulic pressure regulating part B for reducing the hydraulic pressure which is to be supplied to first, second and third solenoid valves S1, S2 and S3 so as to change drive hydraulic pressure from the oil pump into a proper hydraulic pressure capable of actuating clutches, and first and second shift control parts D and E for selectively supplying the hydraulic pressure from the torque control hydraulic pressure regulating part B or the drive hydraulic pressure from the oil pump to each friction element of a friction element part C.

The oil pump 4 is connected to a pressure regulator valve 6, which is capable of varying line pressure when a range mode is changed from the neutral "N" range to a drive "D" range or a reverse "R" range, via a passage 8.

The pressure regulator valve 6 is connected to a converter clutch regulator valve 12, which supplies the hydraulic pressure to the torque converter 2 through a passage 10, via a passage 14. On the passage 14 is mounted a converter feed valve 16.

The converter clutch regulator valve 12 is designed to communicate the passage 14 with a passage 10a or 10b of the passage 10 by movement of a valve spool so as to selectively actuate the damper clutch 2. The movement of the valve spool is controlled by operation of a fourth solenoid valve S4 controlled by a transmission control unit TCU(not shown).

The passage 8 further extends to a solenoid supply valve 18 for reducing the line pressure. A portion of the hydraulic pressure reduced by the solenoid supply valve 18 is supplied to a control switch valve 22 and a torque control hydraulic pressure regulator valve 24 through a passage 20.

Further, a passage branched from the passage 20 extends to the pressure regulator valve 6 and the converter clutch regulator valve 12 to supply control pressure. The control pressure is designed to be changed by the fourth and fifth solenoid valves S4 and S5.

The control switch valve 22 and the torque control hydraulic pressure regulating valve 24 respectively have valve spool, the valve spool of the control switch valve 22 being moved by control of a sixth solenoid valve S6 controlled by the transmission control unit and the valve spool of the torque regulator valve 24 being moved by control of a seventh solenoid valve S7 controlled by the transmission control unit TCU.

The solenoid valve S6 selectively interrupts or exhausts the hydraulic pressure supplied through the passage 20 and controls the position of the valve spool of the control switch valve 22 in right or left direction to change the supply direction of torque control hydraulic pressure.

The seventh solenoid valve S7 changes the hydraulic pressure, which is to be supplied to the valve spool of the torque control regulator valve 24, according to exhaust amount of the hydraulic pressure and thus moves the position of the valve spool to vary the opening range of ports of the torque control regulator valve 24 such that the torque control hydraulic pressure is generated.

The passage 20 further extends from the seventh solenoid valve S7 to a reverse clutch inhibitor valve 26 to supply the hydraulic pressure to a valve spool of the reverse clutch inhibitor valve 26.

The reverse clutch inhibitor valve 26 is a fail safety valve means for preventing the vehicle from reversing when the reverse range is selected by the driver's fault during travelling. This is achieved by the seventh solenoid valve S7 which is controlled to be turned ON/OFF by the transmission control unit.

The control switch valve 22 and the torque control regulator valve 24 are communicated with each other by a torque control hydraulic pressure passage 28. The hydraulic pressure flowing along the passage 28 is hydraulic pressure which is to be supplied from a drive hydraulic pressure passage 32 connected to a manual valve 30 cooperating with a shift lever(not shown).

The manual valve 30 includes parking "P" reverse "R", neutral "N", drive "D", "3", "2", and "L" range modes and has a structure such that the hydraulic pressure is supplied to the drive hydraulic pressure passage 32 at the drive "D" range, "3" range, "2" range, and "L" range modes.

The passage 32 connects the manual valve 30 to the control regulator valve 24 and a first friction element 34 of the friction element part C to supply the hydraulic pressure thereto.

The passage 32 is further connected to a first-second speed shift valve 36 via the torque control regulator valve 24 and the control switch valve 22 to supply the hydraulic pressure thereto. That is, the first-second speed shift valve 36 is connected to the control switch valve 22 by first and second torque control hydraulic pressure passages 38 and 40 to selectively receive the hydraulic pressure from one passage of the first and second torque control hydraulic pressure passages 38 and 40 according to an operation of the control switch valve 22.

The control passage 25 extending from the passage 20 to control the pressure regulator valve 6 and the converter clutch regulator valves 6 and 12 connects the first-second speed shift valve 36 to a second-third speed shift valve 44 to supply the hydraulic pressure thereto, and the second-third speed shift valve 44 is further connected to third-fourth and fourth-fifth speed shift valves 46 and 48 to supply the hydraulic pressure thereto.

The first-second speed shift valve 36 is connected to a second speed clutch valve 54, which supplies the hydraulic pressure to a second friction element 52, through a passage 50.

The second speed clutch valve 54 is connected to the second-third speed shift valve 44 to supply the hydraulic pressure thereto, and the second-third speed shift valve 44 is connected to a third speed clutch valve 60, which supplies the hydraulic pressure to a third friction element 58, through a passage 56.

The third speed clutch valve 60 is connected to the third-fourth speed shift valve 46 to supply the hydraulic pressure thereto, the third-fourth speed shift valve 46 being connected to a fourth speed band valve 66.

The fourth speed band valve 66 is connected to the fourth-fifth speed shift valve 48 to supply the hydraulic pressure thereto, the fourth-fifth speed shift valve 48 being connected to an overdrive unit valve 72, which supplies the hydraulic pressure to a fifth friction element 70, through a passage 68.

The friction element part C further includes a reverse friction element 74 which actuates during reversing, the reverse friction element 74 being connected to a reverse pressure passage 76 extending from the manual valve 30 to receive the hydraulic pressure.

The friction element part C further includes a sixth friction element 78 which is a low reverse clutch, a seventh friction element 80 which is an over run forward drive clutch, and an eighth friction element 82 which is an overdrive unit direct clutch.

Figure 2A:
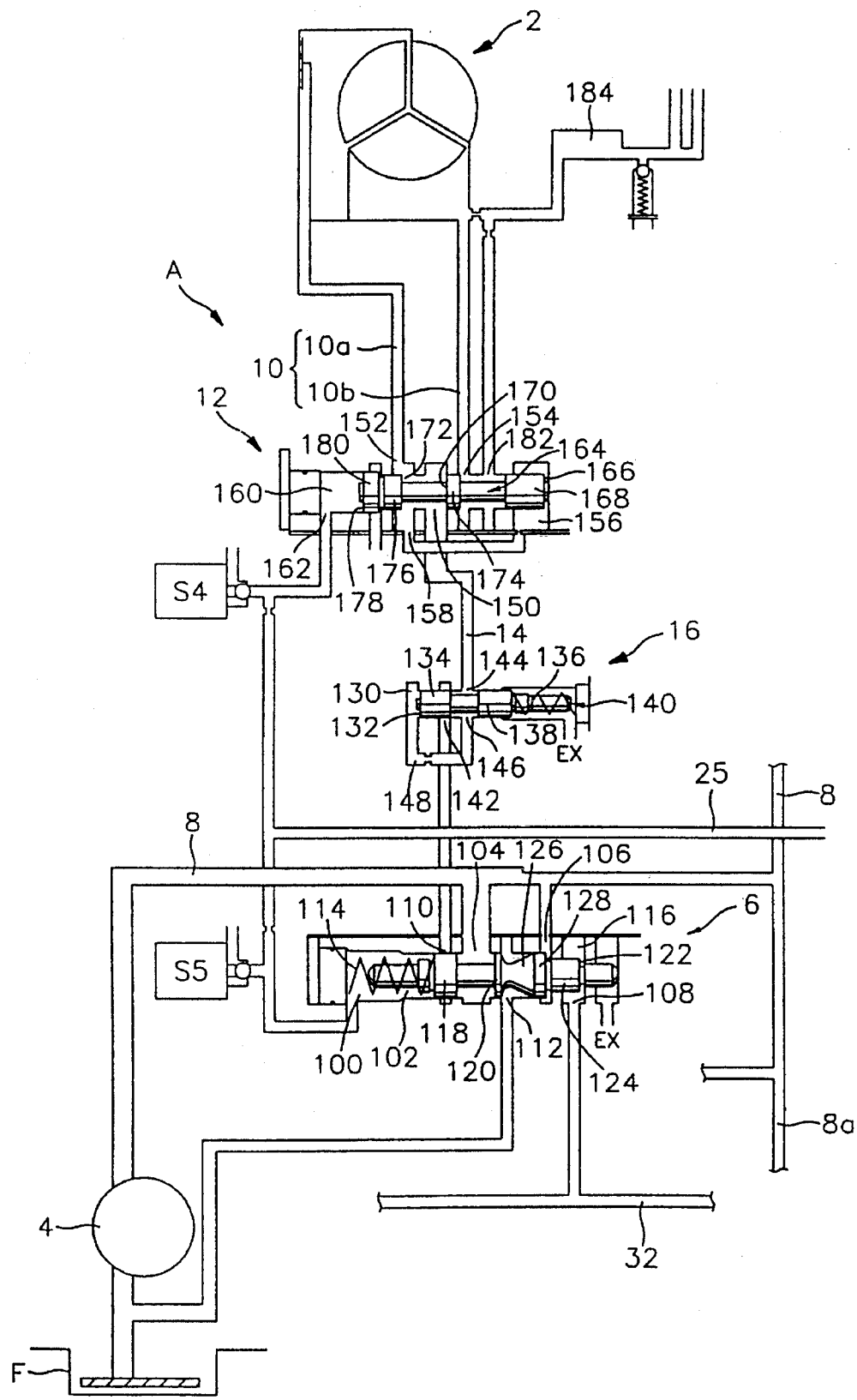
FIG. 2A is an enlarged hydraulic circuit diagram showing a damper clutch control part of the hydraulic control system for the automatic transmission according to the present invention.

FIG. 2A shows an enlarged view of the damper clutch control part A. The damper clutch control part A includes the pressure regulator valve 6 having first and second pressure detecting chambers 100 and 116 defined by a valve body and a valve spool 102 movably located within the pressure detecting chambers 100 and 116. The pressure regulator valve 6 is provided with first and second ports 104 and 106 directly communicating with the line pressure passage 8, a third port 108 communicating with the drive hydraulic pressure passage 3, a fourth port 110 communicating with the converter feed valve 16, and a fifth port 112 for reducing the hydraulic pressure when the line pressure is increased above a regulation pressure.

The valve spool 102 is designed to receive elastic force in the right direction in the drawing by an elastic member 114 located within the first pressure detecting chamber 100 where the hydraulic pressure is formed or exhausted by ON/OFF operation of the fifth solenoid valve S5. The second pressure detecting chamber 116 against the pressure of the first pressure detecting chamber 100 is designed to receive the drive hydraulic pressure through the third port 108 such that position of the valve spool 102 is changed by ON/OFF operation of the fifth solenoid valve S5.

That is, when the fifth solenoid valve S5 is turned "OFF" to increase the hydraulic pressure within the first pressure detecting chamber 100, since this hydraulic pressure is added to the elastic force of the elastic member 114 such that the total pressure becomes larger than the one within the second pressure detecting chamber 116, the valve spool 102 moves rightward. On the contrary, when the fifth solenoid valve S5 is turned "ON" to reduce the hydraulic pressure within the first pressure detecting chamber 100. Since the pressure within the second pressure detecting chamber 116 can overcome the elastic force of the elastic member 114, the valve spool 102 moves leftward.

The valve spool 102 includes a first land 118 for opening and closing the fourth port 110, a second land 120 for opening and closing the fifth port 112, and a third land 124 having a face 122 on which the hydraulic pressure within the second pressure detecting chamber 116 acts.

The valve spool 102 further includes a fourth land 128 having a slanting face 126, which located between the second land 120 and the third land 124. The reason why the face 126 is slanted is not to be affected from fluid force generated when the hydraulic pressure flowing into through the first port 104 is increased above the regulation pressure and then exhausted through the fifth port 112.

The converter feed valve 16 receiving the hydraulic pressure from the fourth port 110 of the pressure regulator valve 6 has a valve spool 140 including a first land 134 having a face 132 on which the hydraulic pressure within a pressure detecting chamber 130 acts, and a second land 138 elastically supported by an elastic member 136.

The first land 134 opens and closes a first port 142, which communicates with the fourth port 110 of the pressure regulator valve 6, to regulate the hydraulic pressure which is to flow out through a second port 144. This is accomplished by the elastic member 136 and the pressure within the pressure detecting chamber 130 communicating with the bypass passage 148.

That is, since the valve spool 140 is moved leftward by the elastic force of the elastic member 136 when the pressure within the pressure detecting chamber 130 is reduced, the first and second ports 142 and 144 are opened. On the contrary, when the pressure within the pressure detecting chamber 130 is increased above the regulation pressure to overcome the elastic force of the elastic member 136, the valve spool 140 moves rightward to close the port 142, thereby interrupting the hydraulic pressure and maintaining its position until the hydraulic pressure is released through the passage 14.

The converter clutch regulator valve 12 receiving the hydraulic pressure from the converter feed valve 16 is provided with a first port 150 communicating with the passage 14, second and third ports 152 and 154 which communicate with the torque converter 2, a fourth port 158 for bypassing the hydraulic pressure flowing into through the first port 150 to a first pressure detecting chamber 156, and a fifth port 162 communicating with the control passage 25 to supply the hydraulic pressure to a second pressure detecting chamber 160.

The converter clutch regulator valve includes a valve spool 164 having a first land 168 having a face 166 on which the hydraulic pressure within the pressure detecting chamber 156 acts, second and third lands 174 and 176 having faces 170 and 172, respectively, on which the hydraulic pressure supplied through the first port 150 acts, and a fourth land 180 having a face 178 on which the hydraulic pressure within the pressure detecting chamber 160 acts.

The hydraulic pressure within the pressure detecting chamber 160 varies by the ON/OFF operation of the fourth solenoid valve S4 so that the valve spool 164 moves leftward or rightward to open and close the ports.

The converter clutch regulator valve 12 is further provided with a sixth port 182 adjacent to the third port 154.

The hydraulic pressure released through the sixth port 182 is cooled while passing a cooler 184 and supplied to a power train, in which the friction element part C is located, to lubricate the power train.

Figure 2B:
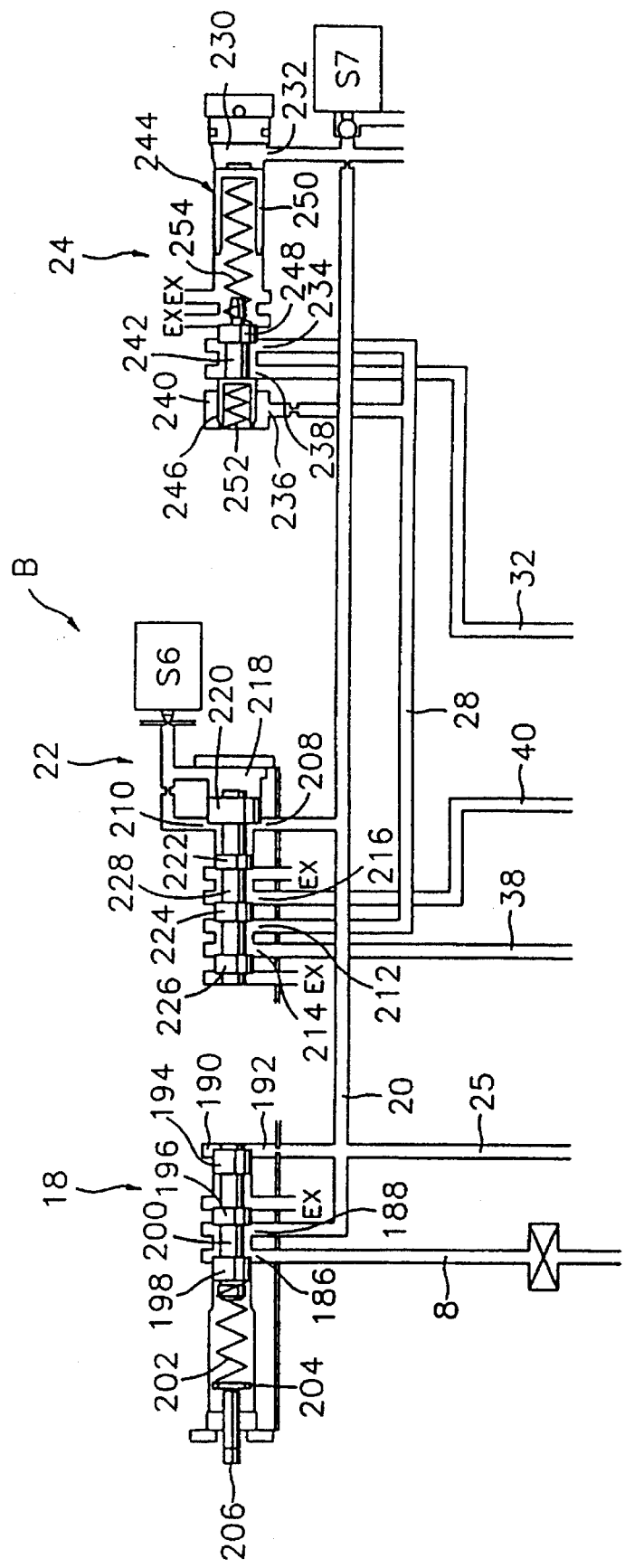
FIG. 2B is an enlarged hydraulic circuit diagram showing a torque control hydraulic pressure regulating part of the hydraulic control system for the automatic transmission according to the present invention.

FIG. 2B shows the torque control hydraulic pressure regulator part B in an enlarged view. The solenoid supply valve 18 is provided with a first port 186 through which the line pressure is supplied from the passage 8, a second port 188 selectively communicating with the first port 186 and being connected to the passage 20, and a third port 192 receiving the hydraulic pressure from the passage 20 and supplying the hydraulic pressure to a pressure detecting chamber 190.

Further, the solenoid supply valve 18 includes a valve spool 200 having a first land 194 on which the hydraulic pressure within the pressure detecting chamber 190 acts, a second land 196 for opening and closing the second port 188 and a third land 198 for opening and closing the first port 186; and an elastic member 202 for elastically supporting the valve spool 200 and resisting the hydraulic pressure within the pressure detecting chamber 190.

The elastic member 202 is supported at its one end to the third land 198 and at its other end to a pushing plate 204. A screw for adjusting force that the valve spool resists the pressure within the pressure detecting chamber 190 contacts an extreme end of the pushing plate 204 to change the elastic force of the elastic member 202.

The control switch valve 22 receiving the control pressure from the passage 20 is provided with a first port 208 communicating with the passage 20, a second port 210 communicating with the first port 208 and the sixth solenoid valve S6, a third port 212 for receiving the hydraulic pressure from the torque control hydraulic pressure passage 28, a fourth port 214 communicating with the first torque control hydraulic pressure passage 38, and a fifth port 216 communicating with the second torque control hydraulic pressure passage 40.

Further, the control switch valve 22 includes a pressure detecting chamber 218 for controlling the hydraulic pressure flowing into through the first and second ports 208 and 210 and a valve spool 228 having a first land 220 on which the hydraulic pressure within the pressure detecting chamber 218 acts, second third, and fourth lands 22, 224 and 226 for selectively dispensing the hydraulic pressure flowing into through the third port 212 to the fourth or fifth port 214 or 216.

The torque control regulator valve 24 receiving the hydraulic pressure from the passage 20 is provided with a first port 232 communicating with the passage 20 and a first pressure detecting chamber 230, second and third ports 234 and 236 connected to the third port 212 of the control switch valve 22 via the torque control hydraulic pressure passage 28, and a fourth port 238 communicating with the drive hydraulic pressure passage 32.

The third port 236 communicates with a second pressure detecting chamber 240. A valve spool 242 is located in the second pressure detecting chamber 240 and includes a plug 246 formed with a cup shape for mounting a first elastic member 252 and a land 248. A valve plug 244 having a cup shape for mounting a second elastic member 254 is located in the first pressure detecting chamber 230.

The second elastic member 254 is supported at its one end to the plug 250 and at its the other end to the first land 248 such that when the hydraulic pressure within the first pressure detecting chamber 230 acts on the plug 250, the elastic member 254 is compressed to give an effect on the position of the valve spool 242.

That is, when the compression force of the second elastic member acts on the valve spool 242, the first elastic member is compressed and thereby the valve spool 242 moves leftward in the drawing. For accomplishing such a result, the elastic force of the second elastic member 254 is designed to be larger than that of the first elastic member 252.

Figure 2C:
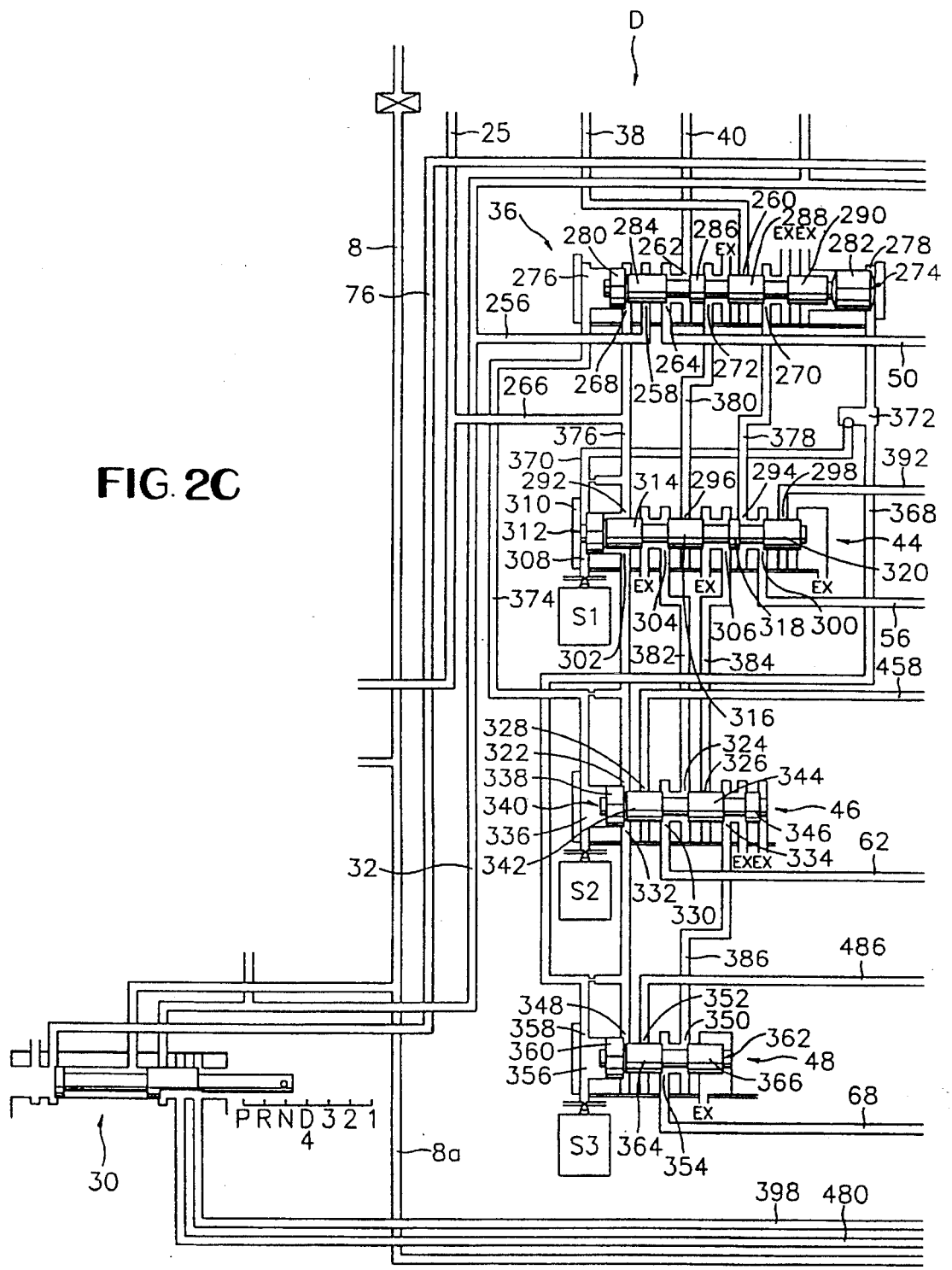
FIG. 2C is an enlarged hydraulic circuit diagram showing a first shift control part of the hydraulic control system for the automatic transmission according to the present invention.

FIG. 2C shows the first shift control part D in an enlarged view. The first-second speed shift valve 36 receiving the drive hydraulic pressure from the drive hydraulic pressure passage 32 and selectively receiving the torque control hydraulic pressure from the first and second pressure passages 38 and 40 is provided with a first port 258 communicating with a first branch passage 256 branched off from the drive hydraulic pressure passage 32, a second port 260 communicating with the first torque control hydraulic pressure passage 38 and a third port 262 communicating with the second torque control hydraulic pressure passage 40.

The first-second speed shift valve 36 is further provided with a fourth port 264 for supplying the hydraulic pressure fed through the first port 258 to the second speed clutch valve 54 via the passage 50, a fifth port 268 for receiving the hydraulic pressure from a second branch passage 266 branched off from the control passage 25, a sixth port 270 for supplying the hydraulic pressure within the first torque control hydraulic pressure passage 38 to the second-third speed shift valve 44 and a seventh port 272 for supplying the hydraulic pressure within the second torque control hydraulic pressure passage 40 to the second-third speed shift valve 44.

The first-second speed shift valve 36 includes a valve spool 274. The valve spool 274 has a first land located in a pressure detecting chamber 276, a second land located in a pressure detecting chamber 278, a third land 284 for opening and closing the first port 258, a fourth land 286 for selectively opening and closing the third, fourth, and seventh ports 262, 264 and 272, a fifth land 288 for opening and closing the second port 260 and a sixth land 290 for opening and closing the sixth port 270.

Each of the first and second land 280 and 282 has a hydraulic pressure acting face larger than that of other lands such that the valve spool 274 moves leftward or rightward.

The second-third shift valve 44 receiving the drive hydraulic pressure from the second branch passage 266 is provided with a first port 292 communicating with the fifth port 268 of the first-second speed shift valve 36, a second port 294 for receiving the torque control hydraulic pressure from the sixth port 270 of the first-second speed shift valve 36, a third port 296 for receiving the hydraulic pressure from the seventh port 272 of the first-second speed shift valve 36, a fourth port 298 for receiving the hydraulic pressure from the second speed clutch valve 54, a fifth port 300 for selectively supplying the hydraulic pressure flowing into through the second and fourth ports 294 and 298 to the third speed clutch valve 60.

The second-third speed shift valve 44 is further provided with sixth, seventh and eighth ports 302, 304 and 306 communicating with the third-fourth speed shift valve 46.

A pressure detecting chamber 308 is defined at an end of a second-third speed shift valve 44. The chamber 308 is designed to receive the hydraulic pressure through an orifice formed in a passage connecting the fifth port 268 of the first-second speed shift valve 36 to the first port 292 of the second-third speed shift valve 44. The hydraulic pressure within the pressure detecting chamber 308 is designed to be increased or reduced by ON/OFF operation of the first solenoid valve S1.

The second-third speed shift valve 44 includes a valve spool 312. The valve spool 312 has a first land 310 on which the hydraulic pressure within the pressure detecting chamber 308 acts, a second land 314 for preventing the hydraulic pressure flowing into through the third port 296 for flowing into through the sixth port 302, a third land 316 for selectively supplying the hydraulic pressure of the third port 296 to the seventh port 304, a fourth land 318 for selectively supplying the hydraulic pressure from the second port 294 to the fifth or eight port 300 or 306 and a fifth land 320 for selectively interrupting the hydraulic pressure of the fourth port 298.

The third-fourth speed shift valve 46 is provided with a first port 322 connected with the sixth port 302 of the second-third speed shift valve 44 to supply the hydraulic pressure thereto, a second port 324 for receiving the hydraulic pressure when the third and seventh ports 296 and 304 of the second-third speed shift valve 44 communicate with each other, and a fourth port 328 for receiving the hydraulic pressure from the third speed clutch valve 60.

The third-fourth speed shift valve 46 is further provided with a fifth port 330 for supplying the hydraulic pressure to the fourth band valve 66 through the passage 62 and sixth and seventh ports 332 and 334 for selectively supplying the hydraulic pressure to the fourth-fifth speed shift valve 48.

The third-fourth speed shift valve 46 defines a pressure detecting chamber 336 which is designed to receive the hydraulic pressure from the sixth port 302 of the second-third speed shift valve 44. The hydraulic pressure within the pressure detecting chamber 336 is designed to be increased or decreased by ON/OFF operation of the second solenoid valve S2.

The third-fourth speed shift valve 46 includes a valve spool 340 having a first land 338 located in the pressure detecting chamber 336, a second land 342 for preventing the hydraulic pressure flowing into through the fourth port 328 for supplying the hydraulic pressure to the sixth port 332, a third land 344 for selectively supplying the hydraulic pressure flowing into through the second port 324 to the fifth port 330 and a fourth land 346 for selectively supplying the hydraulic pressure flowing into through the third port 326 to the seventh port 334.

The fourth-fifth speed shift valve 48 is provided with a first port 348 for receiving the hydraulic pressure from the sixth port 332 of the third-fourth speed shift valve 46, a second port 350 for receiving the hydraulic pressure from the seventh port of the third-fourth speed shift valve 46, a third port for receiving the hydraulic pressure from the fourth speed band valve 66, a fourth port 354 for supplying the hydraulic pressure to the overdrive unit valve 72, and a fifth port 358 for receiving the hydraulic pressure from the third-fourth speed shift valve 46 and supplying the hydraulic pressure to a pressure detecting chamber 356.

The hydraulic pressure within the pressure detecting chamber 356 is designed to be increased or reduced by ON/OFF operation of the third solenoid valve S3.

The fourth-fifth speed shift valve 48 includes a valve spool 362. The valve spool 362 has a first land 360 on which the hydraulic pressure within the pressure detecting chamber 356 acts, a second land for selectively interrupting the hydraulic pressure flowing into through the third and fourth ports 352 and 354 and a third land for selectively interrupting the second and fourth ports 350 and 354.

The pressure detecting chamber 278 of the first-second speed shift valve 36 is designed to communicate with the pressure detecting chamber 356 of the fourth-fifth speed shift valve 48 through the passage 368 to receive the hydraulic pressure. The passage 368 is connected to the passage 370 extending from the pressure detecting chamber 308 of the second-third speed shift valve 44 such that the hydraulic pressure can be supplied to the pressure detecting chamber 278 of the first-second speed shift valve 36.

A shuttle valve 372 is mounted on a connecting portion of the passages 368 and 370. As a result, when the hydraulic pressure is supplied from the pressure detecting chamber 356 of the fourth-fifth speed shift valve 48 to the pressure detecting chamber 278 of the first-second speed shift chamber 36, the passage 370 is closed by the shuttle valve 372, and when the hydraulic pressure is supplied from the pressure detecting chamber 308 of the second-third speed shift valve 44, the passage 368 is closed.

The pressure detecting chamber 276 of the first-second speed shift chamber 36 is designed to communicate with the third-fourth speed shift valve 46, whereby the valve spool moves by the ON/OFF operation of the second solenoid valve S2.

The passage 376 for connecting the fifth port 268 of the first-second speed shift valve 36 to the first port 292 of the second-third speed shift valve 44 extends to the first port 322 of the third-fourth speed shift valve 46 and the first port 348 of the fourth-fifth speed shift valve 48 to receive the control pressure from the second branch passage 266 branched off from the control passage 25. As a result, each valve spool 274, 312, 340 and 362 of the valves 36, 44, 46, and 48 is moved by the operation of the solenoid valves S1, S2 and S3.

The sixth and seventh ports 270 and 272 of the first-second speed shift valve 36 are connected to the second and third ports 294 and 296 of the second-third speed shift valve 44, by the passages 378 and 380, respectively, such that the hydraulic pressure is selectively supplied from the first or second torque control hydraulic pressure passage 38 or 40 in accordance with the position of the valve spool 274.

The seventh and eighth ports 304 and 306 of the second-third speed shift valve 44 are connected to the second and third ports 324 and 326 of the third-fourth speed shift valve 46, by the passages 378 and 380, respectively, such that the hydraulic pressure supplied from the passages 378 and 380 is supplied to the third-fourth speed shift valve 46.

A passage for connecting the seventh port 334 of the third-fourth speed shift valve 46 to the second port 350 of the fourth-fifth speed shift valve 48 receives the hydraulic pressure from the passage 384 and supplies the hydraulic pressure to the overdrive unit valve 72 via the passage 68.

Figure 2D:
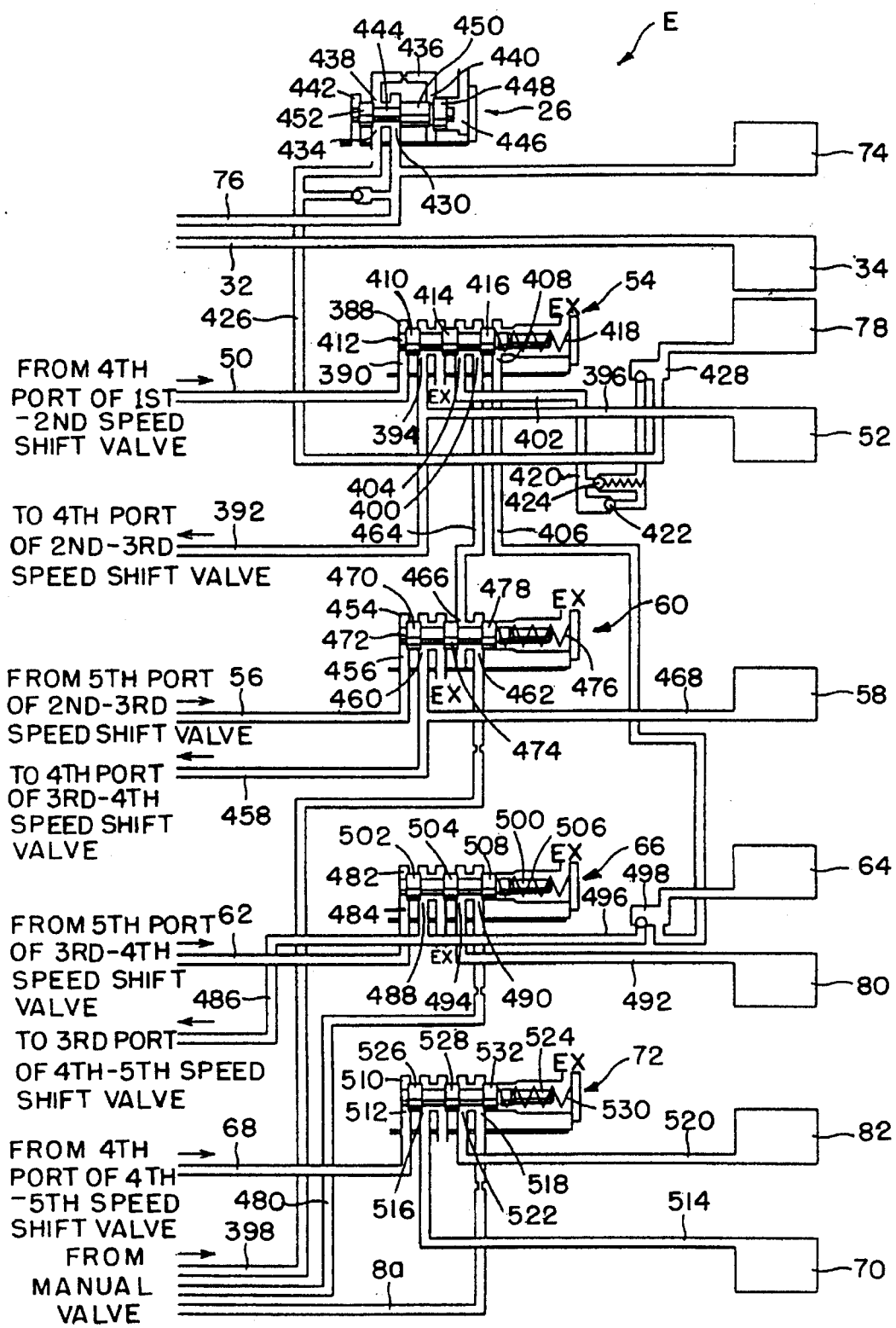
FIG. 2D is an enlarged hydraulic circuit diagram showing a second shift control part of the hydraulic control system for the automatic transmission according to the present invention.

FIG. 2D shows the second shift control part E in an enlarged view. The second speed clutch valve 54 is provided with a first port 390 for supplying the hydraulic pressure from the fourth port 264 of the first-second speed shift valve 36 to a pressure detecting chamber 388 through the passage 50, a second port 394 for supplying the hydraulic pressure to the fourth port 298 of the second-third speed shift valve 44 through the passage 392. A passage 396 is branched off from the passage 392 to supply the hydraulic pressure to the second friction element 52, thereby actuating the second friction element 52.

Further, the second speed clutch valve 54 is provided with a third port 400 for receiving the hydraulic pressure, which is supplied through the passage 398 extending from the manual valve 30, through the third speed clutch valve 60 to actuate the sixth friction element when the shift lever is selected at "2" range, "U" range, or "R" range, a fourth port 404 connected to the passage 402 for supplying the hydraulic pressure to the sixth friction element 78, and a fifth port 408 for supplying the hydraulic pressure to the fourth friction element 64 especially when the shift lever is selected at "2".

The second speed clutch valve 54 includes a valve spool 412 which has a first land 410 on which the hydraulic pressure within the pressure detecting chamber 388 acts, a second and third lands 414 and 416 for supplying the hydraulic pressure flowing into through the third port 400 to the fourth port 404 or the fifth port 408. The first land 410 is elastically supported by the elastic member 418 so that the valve spool 412 can move leftward when the hydraulic pressure within the pressure detecting chamber 388 is exhausted.

The fourth port 404 is designed to supply the hydraulic pressure to the sixth friction element 78 through the passage 420 and two check valves 422 and 424 are mounted in the passage 420, permitting the hydraulic pressure flow in only one direction. The permitted flow direction by the check valve 422 is the opposite of that by the check valve 424. A shuttle valve 428 is also mounted in the passage 420 to prevent the hydraulic pressure, which is supplied from the reverse clutch inhibitor valve 26 to the sixth friction element 78 through the passage 426, from flowing backward to the passage 420.

The reverse clutch inhibitor valve 26 is provided with a first port 430 for receiving the hydraulic pressure from the reverse pressure passage 76, a second port 434 for supplying a reverse pressure to the sixth friction element 78 through the passage 426, and third and fourth ports 438 and 440 which communicate with each other by a bypass passage 436.

A pressure reservoir chamber 442 receiving the hydraulic pressure from the second port 434 is designed to supply the hydraulic pressure to the third port 438 and a pressure detecting chamber 446 is designed to receive the hydraulic pressure which varies by the ON/OFF operation of the seventh solenoid valve S7.

The reverse clutch inhibitor valve 26 includes a valve spool 444. The valve spool 444 has a first land 448 on which the hydraulic pressure within the pressure detecting chamber 446 acts, and second and third lands having a smaller section area than that of the first land 448, on which each hydraulic pressure supplied through the first and second ports 430 and 434 acts, respectively.

The third speed clutch valve 60 receiving the hydraulic pressure, which is supplied from the passage 392, via the passage 56 extending from the fifth port 300 of the second-third speed shift valve 44 is provided with a first port 456 for supplying the hydraulic pressure to a pressure control chamber 454, a second port 460 extending from the passage 458 to supply the hydraulic pressure to the fourth port 328 of the third-fourth speed shift valve 46, a third port for receiving the hydraulic pressure from the passage 398 extending from the manual valve 30, and a fourth port 466 connected to the passage 464 extending form the third port 400 of the second speed clutch valve 54.

A passage 468 is branched off from the passage 458 to supply the hydraulic pressure to the third friction element 58. The third speed clutch valve 60 includes a valve spool 472. The valve spool 472 has a first land 470 on which the hydraulic pressure within the pressure control chamber 454 acts, a second land 474 for selectively supplying the hydraulic pressure from the third port 462 to the fourth port 466, and a third land 478, to which an elastic member 476 for moving the valve spool leftward when the hydraulic pressure within the pressure control chamber is exhausted, is elastically supported.

The fourth band valve 66 for receiving the hydraulic pressure from the manual valve 30 through the passage 480 when the shift lever is selected at "3" "2" or "L" range is provided with a first port 484 for supplying the hydraulic pressure from the fifth port 330 of the third-fourth speed shift valve 46 to a pressure control chamber 482 through the passage 62, a second port 488 communicating with the passage 486 to supply the hydraulic pressure within the pressure 482 to the third port 352 of the fourth-fifth speed shift valve 48, a third port 490 communicating with the passage 480 to receive the hydraulic pressure, and a fourth port 494 for supplying the hydraulic pressure from the third port 490 to the seventh friction element 80 through the passage 492.

The passage 486 connected to the second port 488 is connected to the passage 496 to supply the hydraulic pressure to the fourth friction element 64 in the fourth or fifth speed of "D" range. A shuttle valve is mounted in the passage 496 to prevent the hydraulic pressure from being supplied to the fourth friction element 64 through the passage 406 in "2" range.

A valve spool of the fourth speed band valve 66 includes a first land on which the hydraulic pressure within the pressure control chamber 482 acts, a second land 504 for selectively supplying the hydraulic pressure flowing into through the third port 490 to the fourth port 494, a third land 508 to which an elastic member 506 for moving the valve spool leftward when the hydraulic pressure within the pressure control chamber 482 is exhausted is supported.

The overdrive unit valve 72 for supplying the hydraulic pressure to the eighth friction element 82 which actuates in all speed range excepting the "P" range and the fifth speed of "D" range and the fifth friction element which actuates in only the fifth speed of "D" range is provided with a first port 512 for supplying the hydraulic pressure from the fourth-fifth speed shift valve 48 to a pressure control chamber 510 through the passage 68, a second port 516 for supplying the hydraulic pressure flowing into through the first port 512 to the fifth friction element 70 through the passage 514, a third port 518 for receiving the hydraulic pressure from the passage 8a branched off from the passage 8 extending from the manual valve 30, and a fourth friction element 522 for supplying the hydraulic pressure, which is supplied through the third port 518, to the eighth friction element 518.

A valve spool 524 of the overdrive unit 72 includes a first land 526 on which the hydraulic pressure within the pressure control chamber 526 acts, a second land 528 for selectively supplying the hydraulic pressure which is supplied through the third port 518, to the fourth port 522, and a third land to which an elastic member for moving the valve spool leftward is supported.

The solenoid valves S1,S2,S3,S4,S5,S6 and S7 are duty or ON/OFF controlled by the transmission control unit(not shown) in accordance with open degree of a throttle valve and vehicle speed.

Figure 3:
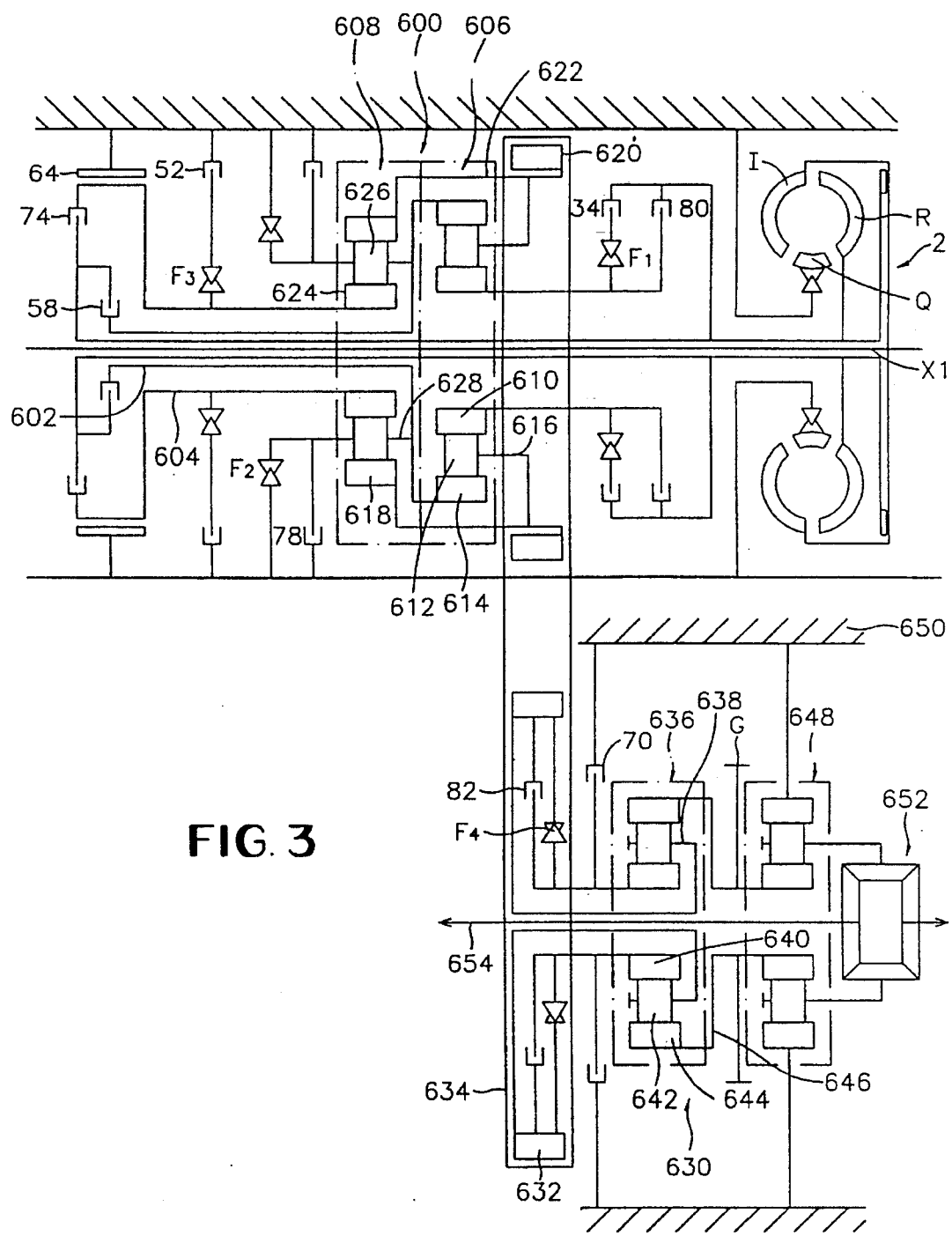
FIG. 3 is a schematic diagram of a power train controlled by the hydraulic control system for the automatic transmission according to the present invention.

FIG. 3 shows the power train which changes speed ratio by the friction element part C according to the present invention. The torque converter 2 includes a pump impeller I directly connected to a crank shaft of the engine to rotate therewith, a turbine runner R being against the impeller I and rotating by oil, and a stator Q, which is located between the pump impeller and the turbine runner R, for increasing rotating power by changing the flowing direction of the oil.

The turbine runner R is directly connected to an input shaft X1 of the main transmission part 600 to transmit the rotating power of the engine. A third speed input shaft 602 and a reverse sun gear shaft 604 are rotatably mounted on an outer circumference of the input shaft X1.

The third speed input shaft 602 and the reverse sun gear shaft 604 receive the rotating power through the third friction element 58 and the reverse friction element 74, respectively and transmit the rotating power to first and second planetary gear units 606 and 608, respectively.

The main transmission part 600 which receives the rotating power of the input shaft X1 comprises the first and second planetary gear units 606 and 608. The first planetary gear unit 606 includes a sun gear 610 directly receiving the rotating power of the input shaft X1 through the seventh friction element 80 and the first friction element 34 which is a forward clutch, a planet gear 612 being in mesh with an outer circumference of the sun gear 610, and an annulus gear 614 being in mesh with the planet gear 612.

The plurality of the planet gears 612 are evenly divided and mounted by a carrier 616, and the carrier 616 is integrally mounted on an output drum 622 connecting the drive sprocket 620 to the annulus gear 618.

The second planetary gear unit 608 has the same structure as that of the first planetary gear unit 606, that is, includes a sun gear 624, a planet gear, an annulus gear 618 and a carrier 628.

The annulus gear 614 of the first planetary gear unit 606 receives the rotating power of the third speed input shaft 602 through the third friction element 58 and is connected to the carrier 628 to transmit the power thereto.

The rotation in any direction of the reverse sun gear shaft 604 is locked by the fourth friction element 64 and the rotation in the counter-clockwise direction is locked by the second friction element 52 which is a second speed brake.

A one-way clutch F3 is mounted between the second friction element 52 and the reverse sun gear shaft 604 and is designed to operate in a second-third speed up-shift. Rotation in any direction of an extending portion of the carrier 628 of the second planet gear unit 608 is locked by the sixth fiction element 78.

Rotation in the counter-clockwise direction of the extending portion of the carrier 628 is locked by the one-way clutch F2 which operate at a first-second speed up-shift.

A one-way clutch F1 is mounted between the first friction element 34 and the sun gear 610 of the first planetary gear unit 606 and is designed to operate at a third-fourth speed up-shift.

The drive sprocket 620 is connected to the driven sprocket 632 by means of a chain 634 to transmit the power to the driven sprocket 632.

The driven sprocket 632 is connected to a carrier 638 to transmit the power to a third planetary gear unit 636. The carrier 638 evenly divides intervals between the planet gears 642 being in mesh with an outer circumference of a sun gear 640.

The planet gears 642 are in mesh with the annulus gear 644 to transmit the power, and the annulus gear 644 transmits the power to a final reduction planetary gear unit 648 through a output flange 646.

Between the driven sprocket 632 and the sun gear 640, the eighth friction element which is subtransmission clutch and a one-way clutch F4 which operates in a fourth-fifth speed up-shift are mounted, and in a transmission case 650, a fifth friction element 70 which is a sub-transmission brake and actuates in a fifth speed of the drive "D" range is mounted.

The final reduction planetary gear unit 648 transmits the rotating power to a differential unit 652 and this rotating power is transmitted to wheels(not shown) through the output shaft 654.

In the hydraulic pressure control system for automatic transmission according to the present invention as described above, when the engine starts, a drive gear(not shown) of the oil pump 4 rotates to induct the oil within the oil pan F, thereby generating the hydraulic pressure.

The hydraulic pressure is supplied to the solenoid supply valve 18 through the passage 8 and then supplied to the control switch valve 22 and the torque control regulator valve 24 along the passage 20.

Further, the hydraulic pressure is supplied to the pressure regulator valve 6 and the converter clutch regulator valve 12 through the control passage 25 branched off from the passage 20 to act as a control pressure, and a portion of the hydraulic pressure is supplied to the first-second, second-third, third-fourth and fourth-fifth speed shift valves 36, 44, 46 and 48.

Further, another portion of hydraulic pressure is supplied to the overdrive unit valve 72 along the passage 8a extending from the passage 8 to actuate the eighth friction element 82, and the other portion of the hydraulic pressure is supplied to the manual valve.

This flow of the hydraulic pressure, as shown in FIG. 1, shows a interrupting state thereof at the manual valve when the shift lever is selected at neutral "N" range. In this state, when the first and third solenoids valve S1 and S3 are turned ON and the second solenoid valve S2 is turned OFF, valve spools of each of the first-second and third-fourth speed shift valve 36 and 46 move rightward.

At this point, when the shift lever is selected at the drive "D" range, the fifth solenoid valve S5 is duty-controlled from ON state to OFF state by the transmission control unit to regulate the line pressure within the passage 8.

At this point, if a slip of the friction element relating to the speed change occurs, the fifth solenoid valve S5 is duty-controlled with OFF state. When the solenoid valve S5 is turned OFF as described above, the hydraulic pressure within the pressure detecting chamber 100 of the pressure regulator valve 6, as shown in FIG. 2A, increase, such that sum of this hydraulic pressure and the elastic force of the elastic member 114 acts on the first land 118 to move the valve spool 102 rightward in the drawing.

However, if the slip of the friction element relating to the speed change does not occur, the fifth solenoid valve S5 is duty- controlled from OFF state to ON state and releases the hydraulic pressure within the pressure detecting chamber, such that the valve spool 102 is moved leftward by the hydraulic pressure acting on the right side of the third land 124 of the valve spool 102 through the drive hydraulic pressure passage 32.

If this happens, the second land 120 of the valve spool 102 is to be located to communicate the first port 104 with the fifth port 112 which is an exhaust port, such that the hydraulic pressure within the passage 8 returns to the oil pan F.

Returning of the oil can minimize a drive loss of the oil pump 4. At this point, if the slip of the friction element relating to the speed change occurs again, the fifth solenoid valve S5 is duty controlled from ON state to OFF state to increase the hydraulic pressure within the pressure detecting chamber 100. As a result, the valve spool 102 moves rightward to interrupt the fifth port 112 so that the hydraulic pressure within the hydraulic pressure is used for actuating the friction element.

Such operation is repeated, according as the slip of the friction elements occur or not. During such operation, the first and fourth ports 104 and 110 of the pressure regulator valve 6 communicates with each other so that the line pressure within the passage 8 is supplied to the first port 142 of the converter feed valve 16.

At this point, since the valve spool 140 of the converter feed valve 16 is elastically supported by the elastic member 136, the valve spool 140 moves a bit leftward in the drawing, such that the first port 142 is partially opened. Accordingly, a portion of the hydraulic pressure flowing into through the first port 142 flows out through the second port 144 and the other portion of the hydraulic pressure flows into the pressure detecting chamber 130 through the bypass passage 148.

When the hydraulic pressure flowing into the pressure detecting chamber 130 increases, the valve spool 140 moves rightward to interrupting the hydraulic pressure flowing into through the first port 142. The damper clutch control pressure and the lubricating pressure are regulated by repeating this operation.

The hydraulic pressure flowing out through the second port 144 of the converter feed valve 16 flows into through the first port 150 of the converter clutch regulator valve 12 and then flows our to one of the passages 10a and 10b.

At this point, selecting one of the passages 10a and 10b depends on the ON/OFF operation of the fourth solenoid valve S4. In actuating range of the damper clutch, the fifth solenoid valve S4 is turned ON so that the hydraulic pressure within the pressure detecting chamber 160 is decreased.

As a result, a portion of the hydraulic pressure flowing into through the first port 150 is supplied to the pressure detecting chamber 156, which is defined at the right side of the valve spool 164, through the fourth port 158.

At this state, although the hydraulic pressure supplied from the passage 14 simultaneously acts on the pressure acting face 170 of the second land 174 and the pressure acting face 172 of the third land 176, the valve spool 164 is moved leftward in the drawing by the hydraulic pressure acting on the pressure acting face 166 of the first land 168.

As a result, since the first and second lands 168 and 174 of the valve spool 164 are to be located at the right side of the third port 154 and the left side of the first port 150, respectively, the first and third ports communicate with each other. The hydraulic pressure flowing into through the first port 150 is supplied to the torque converter 2 through the passage 10b to actuate the damper clutch.

On the contrary, when the solenoid valve S4 is turned OFF by the transmission control unit in non- actuating range of the damper clutch, the hydraulic pressure within the converter clutch regulator valve 12 increases and acts on the pressure acting face 178 of the fourth land 180.

At this point, although the hydraulic pressure within the pressure detecting chamber 156 acts on the pressure acting face 166 of the first land 168, since the section area of the fourth land 180 is larger than that of the first land 168, the valve spool 164 moves rightward.

When the valve spool 164 moves rightward as described above, the second land 174 is to be located at the right side of the third port 154 to interrupt the hydraulic pressure flowing into the first port 150, At this point, since the third land 176 is to open the second port 152 in part, the hydraulic pressure flowing into through the first port 150 is supplied to the passage 10a through the second port 152.

Actuating or non-actuating range of the damper clutch is detected by a sensor(not shown) which transmits signal to the transmission control unit and the solenoid valve S4 is turned ON/OFF in accordance with the signal to actuate or non-actuate the damper clutch. The actuating is selectively performed by the running state of the vehicle at each speed ratio which will be described in below.

" FIRST SPEED OF DRIVE "D" RANGE "

Figure 4:
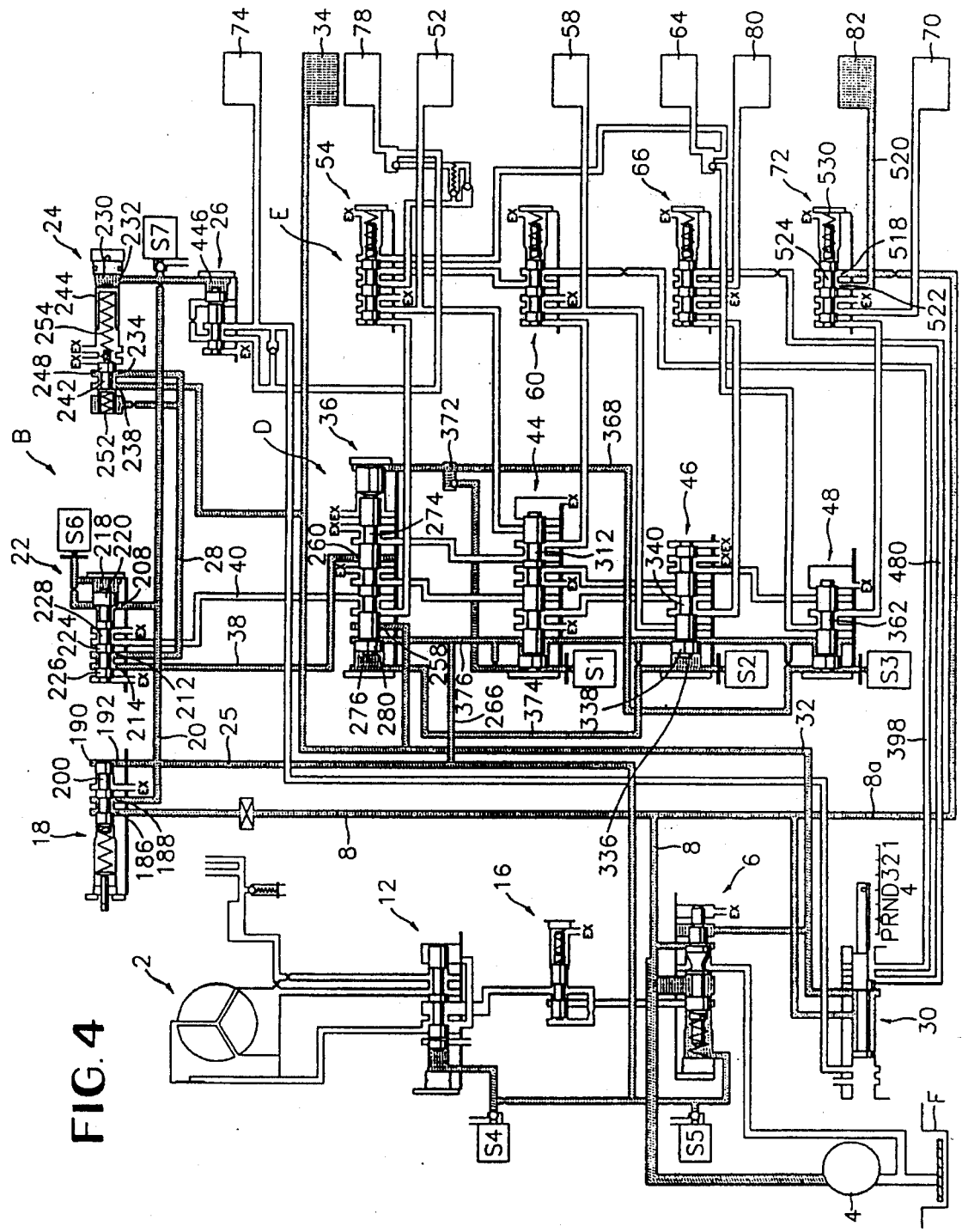
FIG. 4 is the hydraulic circuit diagram showing a formation of the hydraulic pressure at a first speed of a drive "D" range of the hydraulic control system for the automatic transmission according to the present invention.

FIG. 4 shows a hydraulic control system for performing the first speed of drive "D" range. A portion of the hydraulic pressure from the passage 8 through which the line pressure varied by the pressure regulating valve 6 flows is used for lubricating or actuating the damper clutch of the torque converter 2, the other portion of the hydraulic pressure is supplied to the solenoid supply valve 18 of the torque control hydraulic pressure regulator part B and the overdrive unit valve 72 through the passage 8*a*.

At this point, since the valve spool 524 of the overdrive unit valve 72 is moved leftward by the elastic member 530 and the second and third lands 528 and 532 is located at the left side of the fourth port 522 and the right side of the third port 518, respectively, such that the hydraulic pressure flowing along the passage 8*a* is supplied to the eighth friction element 82 along the passage 520, to actuate the eighth friction element 82. (See FIG. 2B)

The hydraulic pressure which is to be supplied to the solenoid supply valve 18 flows into through the first port 186, at this point, since the first port 186 is partly opened by the third land 198 of the valve spool 200 which is moved rightward by the elastic member 202, the hydraulic pressure varies while passing through the first port 186 and is supplied to the passage 20 via the second port 188.

At this point, the hydraulic pressure flows into the pressure detecting chamber 190 through the port 192 communicating with the passage 20 to increase the hydraulic pressure within the pressure detecting chamber 190. And when the hydraulic pressure acting on the first land 194 becomes larger than that of the elastic force of the elastic member 202, the valve spool 200 moves leftward in the drawing.

Accordingly, the second land 196 is located between the first and second ports 186 and 188 to interrupt the flowing of the hydraulic pressure. By this operation, the hydraulic pressure within the control passage 25 which communicates with the passage 20 and supplies the hydraulic pressure to the solenoids valve S1, S2 and S3 is reduced.

After the second land 196 of the valve spool 200 closes the second ports 188, if the hydraulic pressure within the pressure detecting chamber 190 is reduced, the valve spool 200 is moved rightward again by the elastic force of the elastic member 202 to communicate the second and first ports 188 and 186 with each other.

In a state where the first port 186 and the second port 188 communicate with each other, a portion of the hydraulic pressure flows along the passage 20. And the other portion of the hydraulic pressure flows along the control passage 25 and relates to the displacement of the valve spools of each of the pressure regulator valve 6 and the converter clutch regulator valve 12, and is supplied to the first-second, second-third, third-fourth, and fourth-fifth speed shift valves 36, 44, 46 and 48 through passage 266.

Further, a portion of the hydraulic pressure flowing along the passage 20 is supplied to the control switch valve 22 through the first port 208 and stayed at the pressure detecting chamber 218 and the other portion of the hydraulic pressure is supplied to the torque control regulator valve 24 through the first port 232 and stayed at the pressure detecting chamber 230.

At this point, since the first and third solenoid valves S1 and S3 are turned OFF by the transmission control unit and the second, sixth and seventh solenoid valves S2, S6 and S7 maintain their OFF state, each hydraulic pressure within pressure detecting chambers 18 and 230 of the control switch valve 22 and the torque control regulator valve 24, respectively, increases.

By this increase of the hydraulic pressure, the valve spool 228 of the control switch valve 22 and the valve plug 244 of the torque control regulator valve 24 are to move leftward.

Accordingly, the third and fourth lands 224 and 226 of the control switch valve 22 are located at the right side of the third port 212 and the left side of the fourth land 214, respectively, such that the third port 212 for receiving the hydraulic pressure from the torque control hydraulic pressure passage 28 communicates with the fourth port 214.

Further, since the valve plug 244 of the torque control regulator valve 24 compresses the second elastic member 254, the valve spool 242 moves leftward while compressing the first elastic member 252 via the compression of the second elastic member 254, whereby the fourth port 238 receiving the hydraulic pressure from the drive hydraulic pressure passage 32 communicates with the second port 234.

On the other hand, in drive "D" range, since the hydraulic pressure within the passage 8 flows to the drive hydraulic pressure passage 32 through the manual valve 30, a portion of the hydraulic pressure of the drive hydraulic pressure passage 32 flows into through the fourth port 238 of the torque control regulator valve 24 and other portion of the hydraulic pressure is supplied to the first friction element 34, thereby actuating the first friction element in addition to the eighth friction element 82. (See FIG. 4)

As described above, by actuating the first and eighth friction elements 34 and 82, the first speed is accomplished in the power train shown in FIG. 3.

That is, when torque of the torque converter which is driven by power of the engine is transmitted to the input shaft S1, since the first friction element 34 is actuated, the rotation power of the input shaft X1 is transmitted to the sun gear 610 of the first planetary gear unit 606, thereby rotating the sun gear 610 in the clockwise direction when viewed from the engine.

Accordingly, although planet gear which is in mesh with sun gear 610 receives the rotating power in the counter-clockwise direction and tries to rotate the annulus gear in the counter-clockwise direction, since the carrier 628 connected to the annulus gear 614 can not be rotated by the one-way clutch F2, the planet gear 612 rotates on its axis in the counter-clockwise direction and rotate around the sun gear 610 in the clockwise direction such that the planetary gear unit 606 rotates with increased torque.

The rotating power of the planetary gear unit 606 is transmitted to the drive sprocket 620 through the carrier 616 to rotate the sprocket 620 in the clockwise direction such that the driven sprocket 632 of the subtransmission part 630 rotates in the clockwise direction. Since the sprocket 632 is connected to the carrier 638 of the third planetary gear unit 636, the carrier 638 rotates in the clockwise direction and rotates the planet gear 642.

At this point, since the rotating power is transmitted to the sun gear 640 through the eighth friction element 82, the third planetary gear unit 636 which has the carrier 638 and sun gear 640 as an input element bodily rotates and transmits the rotating power to the planetary gear unit 648 to accomplish the final speed reduction and transmit the power to the differential unit 652, thereby moving forward the vehicle with first speed.

On the other hand, the hydraulic pressure supplied to the torque control regulator valve 24 through the fourth port 238 flows out through the second port 234 and is supplied to the control switch valve 22 via the torque control hydraulic pressure passage 28 and the third port 212 of the control switch valve 22. By this operation, since the third port 212 is to communicate with the fourth port 214, the hydraulic pressure is supplied to the first-second speed shift valve 36 of the first shift control part D via the first torque control hydraulic pressure passage 38 and the second port 260 of the first-second speed shift valve 36.

At this point, since the solenoid valve S2 is in OFF state, the hydraulic pressure within the pressure detecting chamber 336 of the third-fourth speed shift valve 46 is increased and supplied to the pressure detecting chamber 276 of the first-second speed shift valve 36 through the passage 374. This hydraulic pressure acts on the first land 280 of the first-second speed shift valve 36 to move the valve spool 274 rightward such that the second port 260 of the first-second speed shift valve 36 is closed by the fifth land 288. As a result, the torque control hydraulic pressure flowing along the first torque control hydraulic pressure passage 38 maintains its stand by state.

" FIRST-SECOND SPEED UP-SHIFT OF DRIVE "D" RANGE "

When the vehicle speed is gradually increased and thereby the open degree of the throttle valve is increased in the state of first speed, the transmission control unit controls the fifth solenoid valve S5 to generate the hydraulic pressure and suspends the variation of the line pressure, and then controls the solenoid valve S6 to be turned ON to initiate the speed change.

At this point, since the seventh solenoid valve S7 is controlled with high duty ratio, the hydraulic pressure within the pressure detecting chamber 230 of the torque control regulator valve 24 is reduced, at this state, since the hydraulic pressure which acts against the valve plug 244 is released, the valve plug 244 is moved rightward by the sum of the elastic forces of the fist and second elastic members 252 and 254.

Accordingly, the valve spool 242 which was moved leftward by the second elastic member 254 moves rightward to interrupt the fourth port 238 extending from the drive hydraulic pressure passage 32.

By this operation, the hydraulic pressure flowing along the torque control hydraulic pressure passage 28 is disappeared, and since the sixth solenoid valve S6 is controlled to be turned ON, the hydraulic pressure within the pressure detecting chamber 218 of the control switch valve 22 is released.

At this point, although the hydraulic pressure is supplied to the control switch valve 22 via the first port 208 and acts on the left side face of the first land 220 and the right side face of the second land 222, simultaneously, since the area of the pressure acting face of the first land 220 is larger than that of the second land 222, the valve spool 228 moves rightward. (See FIG. 5)

Accordingly, the third land 224 of the control switch valve 22 is located at the right side of the fifth port 216 and the fourth land 226 is located at the left side of the third port 212, such that the third port 212 receiving the hydraulic pressure from the torque control hydraulic pressure passage 28 is to communicate with the fifth port 216.

At this point, when the transmission control unit controls the seventh solenoid valve S7 with low duty ratio again such that the hydraulic pressure within the pressure detecting chamber 230 of the torque control regulator valve 24 is increased.

As a result the valve plug 244 moves leftward to compress the second elastic member 254 so that the valve spool 242 is moved leftward by the compression of the second elastic member 254 while compressing the first elastic member 252.

Accordingly, the torque control hydraulic pressure which is generated in accordance with the communication state of the fourth port 238 of the torque control regulator valve 24, which receives the hydraulic pressure from the drive hydraulic pressure passage 32, and the second port of the torque control regulator valve 24 flows into through the third port 212 of the control switch valve 22 through the torque control hydraulic pressure passage 28 and then flows out through the fifth port communicating with the third port 212. Accordingly, this torque control hydraulic pressure flows into through the third port 262 of the first-second speed shift valve 36 along the second torque control hydraulic pressure passage 40.

At this point, since the second solenoid valve S2 is controlled with OFF state, the valve spool 274 of the first-second speed shift valve 36 moves rightward, such that the third and fourth ports 262 and 264 communicate with each other. The torque control hydraulic pressure is supplied to the second speed clutch valve 54 through the passage 50.

That is, the torque control hydraulic pressure is supplied to the second speed clutch valve 54 of the second shift control part E through the first port 390. Accordingly, as shown in FIG. 2D, although the valve spool 412 of the second speed clutch valve 54 is elastically supported by the elastic member 418 and thereby is moved leftward, since the torque control hydraulic pressure is supplied to the pressure control chamber 388 and acts on the first land 410, the valve spool 412 moves rightward.

As a result, the first land which has interrupted the first port 390 moves to right side of the second port 394 such that a portion of the torque control hydraulic pressure flowing along the passage 50 is supplied to the second friction element 52 to actuate thereof and the other portion of the hydraulic pressure stands by the fourth port 298 of the second-third speed shift valve 44 through the passage 392.

Figure 5:
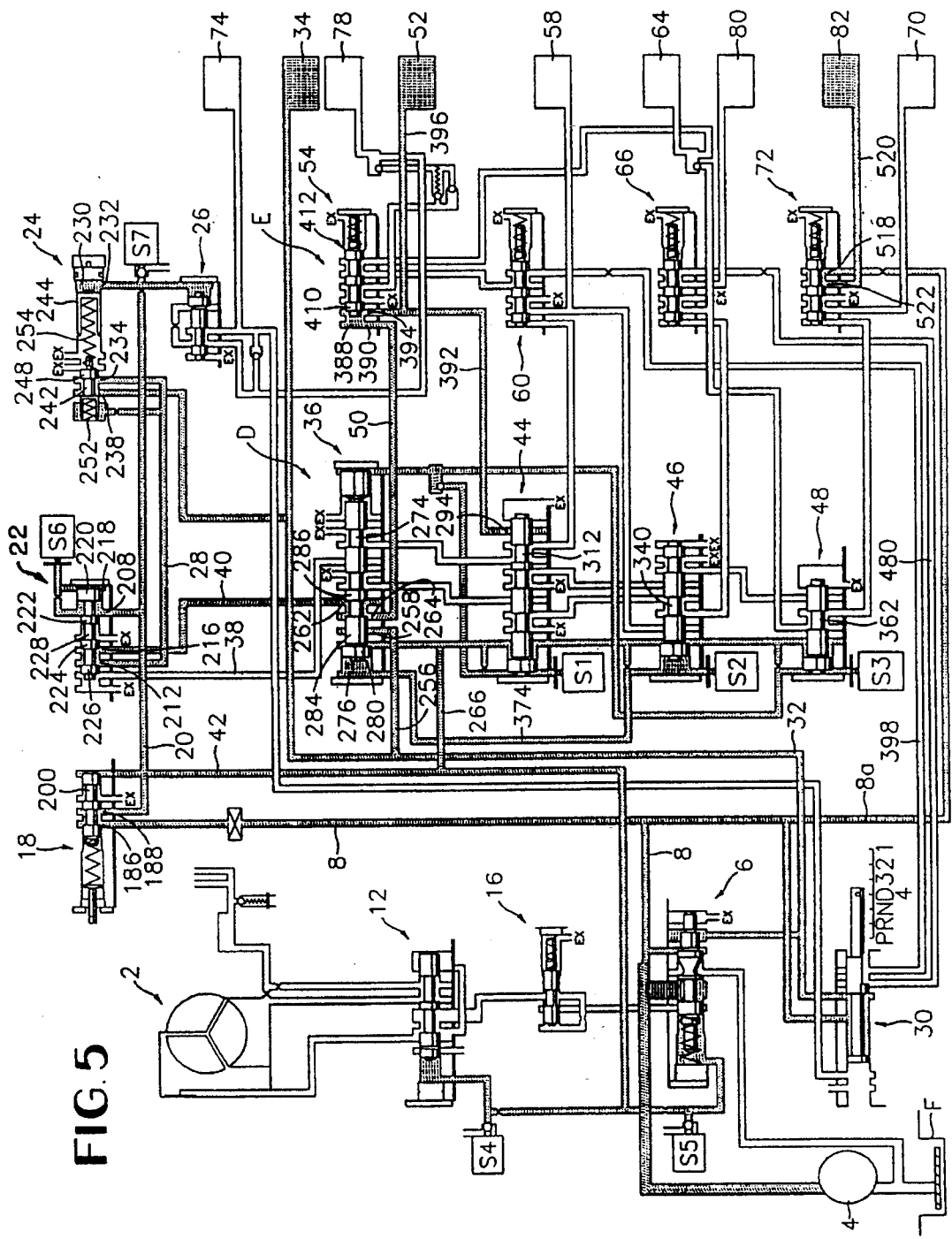
FIG. 5 is the hydraulic circuit diagram showing a formation of the hydraulic pressure at a first-second speed up-shift of the drive "D" range of the hydraulic control system for the automatic transmission according to the present invention.

At this point, since the first and eighth friction elements 34 and 82 are actuating as at the first speed, as shown in FIG. 5, three friction element 34, 52 and 82 is to be actuated.

During the first-second speed up-shift, since the first port 258 of the first-second speed shift valve 36 receiving the hydraulic pressure from the drive hydraulic pressure passage 32 is interrupted by the third land 284, the drive hydraulic pressure is not supplied to the second friction element 52. That is, the second friction element 52 is actuated by the torque control hydraulic pressure which is lower than the drive hydraulic pressure at the first-second speed up-shift.

" SECOND SPEED OF DRIVE "D" RANGE"

Figure 6:
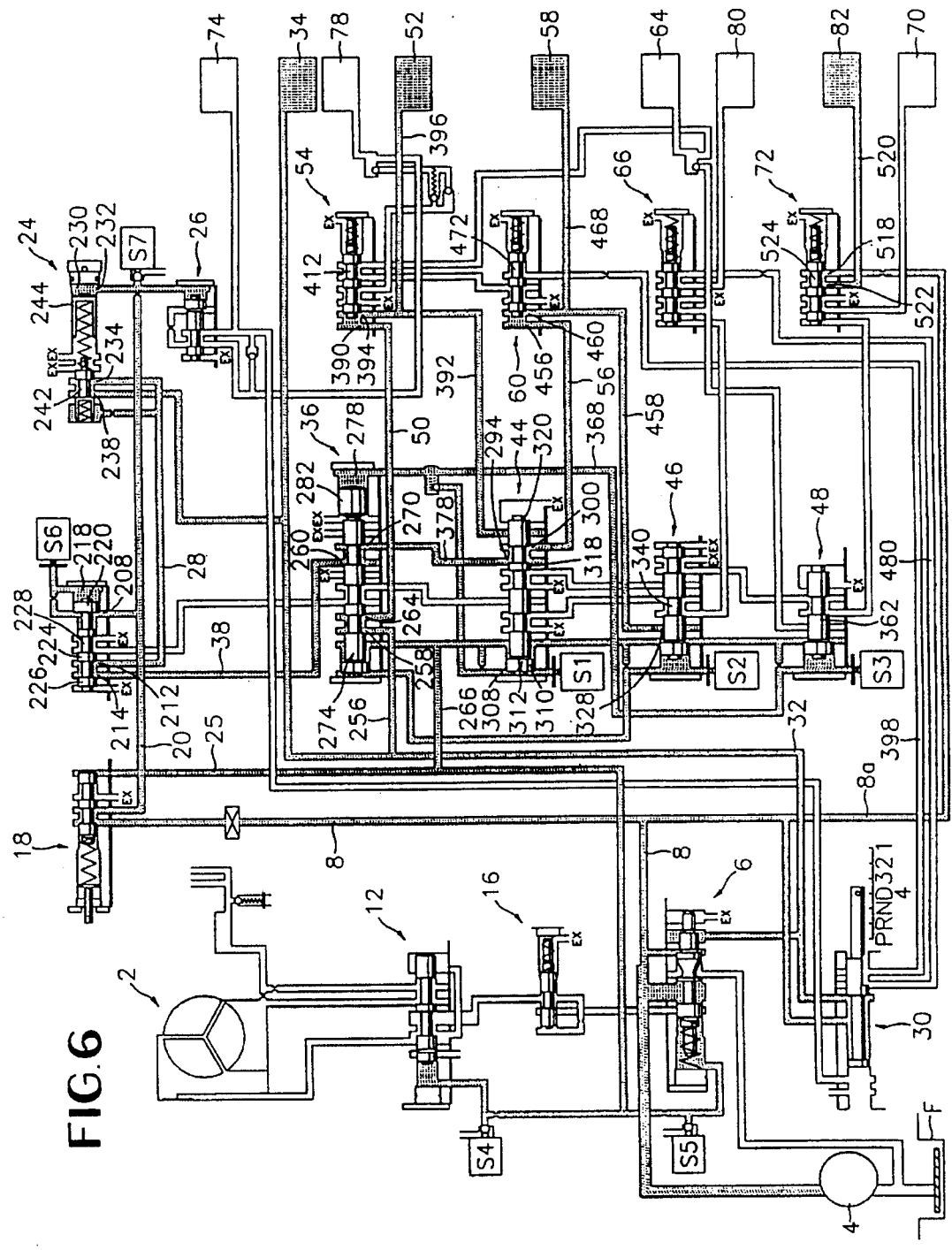
FIG. 6 is the hydraulic circuit diagram showing a formation of the hydraulic pressure at a second speed of the drive "D" range of the hydraulic control system for the automatic transmission according to the present invention.

When the first-second speed up-shift by the torque control hydraulic pressure is completed as described above, the third solenoid valve S3 is controlled to be turned OFF by the transmission control unit to interrupt the hydraulic pressure. As a result, the hydraulic pressure is formed within the pressure detecting chamber 356 of the fourth-fifth shift valve 48 and then this hydraulic pressure is supplied to the pressure detecting chamber 278 of the first-second speed shift valve 36 through the passage 368 to act on the second land 282. (See FIG. 6)

At this point, although the hydraulic pressure is formed within the pressure detecting chamber 276 of the first-second speed shift valve 36 and acts on the first land 280 since the second solenoid valve S2 is controlled to be turned OFF, the valve spool 274 moves leftward since the second land 282 receive the hydraulic pressure at its right face and the first land 280 receive the hydraulic pressure at its left and right faces.

As a result, the fourth land 286 of the first-second speed shift valve 36 is located at the left side of the third port 262 to close the fourth port 264 and to open the seventh port 272, such that the torque control hydraulic pressure flowing along the second torque control hydraulic pressure passage 40 is not supplied to the second speed clutch valve 54 but is supplied to second-third shift valve 44 and stands by the third port 296.

And at the same time, since the first and fourth ports 258 and 264 of the first-second speed shift valve 36 is to communicate with each other, the hydraulic pressure which stands by the first branch passage 256 branched off from the drive hydraulic pressure passage 32 is supplied to the second speed clutch valve 54 through the first and fourth ports 258 and 264, thereby actuating the second friction element 52 by the same operation as that of the first-second speed up-shift. (See FIG. 6)

That is, the torque control hydraulic pressure control is converted into the drive hydraulic pressure control. When the first, second, and eighth friction elements 34, 52 and 82 are actuated as described above, the second speed is accomplished at the power train shown in FIG. 3.

The second speed is accomplished by actuating the second friction element 52 in addition to the first and eighth friction elements 34 and 82. The rotating power of the input shaft X1 is transmitted to the first planetary gear unit 606 through the first friction element 34 and rotates the sun gear 160 in the clockwise direction when viewed from the engine. (See FIG. 3)

At this point, since the sun gear 624 is fixed by the second friction element 52, the rotating speed of the output drum 622 is faster than that of in the first speed where the annulus gear 614 and the carrier 628 of the first planetary gear unit 606 are fixed by the one-way clutch F2.

The rotating power rotates the drive sprocket 620 through output drum 622 and then this. rotating power is transmitted to the driven sprocket 632 of the sub-transmission part 630 through by the chain member 634.

"SECOND-THIRD SPEED UP-SHIFT OF DRIVE "D" RANGE"

When the vehicle speed is gradually increased and thereby the open degree of the throttle valve is increased in the state of the second speed, the transmission control unit controls the fifth solenoid valve S5 to suspend the variation of the line pressure, and then controls the seventh solenoid valve S7 with high duty ratio to reduce the torque control hydraulic pressure to zero, thereby initiating the speed change.

At this point, the sixth solenoid valve S6 is controlled to be turned OFF to interrupt the hydraulic pressure, such that the hydraulic pressure within the pressure detecting chamber 218 of the control switch valve 22 increases. (See FIG. 7)

As a result, since the hydraulic pressure acts on the right side face of the first land 220 of the control switch valve 22, the valve spool 228 moves leftward. And the third land 224 is to be located at the right side of the third port 212 and the fourth land 226 is to be located at the left side of the fourth port 214, whereby the third and fourth ports 212 and 214 communicate with each other.

And at the same time, the seventh solenoid valve S7 is controlled to be turned OFF by the transmission control unit so that the hydraulic pressure is interrupted. As a result, the hydraulic pressure within the pressure detecting chamber 230 of the torque control regulator valve 24 increases, thereby moving the valve spool and valve plug 242 and 244 leftward.

Accordingly, the hydraulic pressure flowing along the passage 20 flows into through the fourth port 238 of the torque control regulator valve 24 and flows out through the second port 234. Further, the hydraulic pressure is supplied to the first torque control hydraulic pressure passage 38 through the third and fourth ports 212 and 214 of the control switch valve 22 along the torque control hydraulic pressure passage 28.

The torque control hydraulic pressure flowing along the torque control hydraulic pressure passage 38 is supplied to the first-second speed shift valve 36. At this point, since the third solenoid valve S3 is in a state of turning OFF to move the valve spool 274 of the first-second speed shift valve 36 leftward, the hydraulic pressure flowing into through the second port 260 is supplied to the second port 294 of the second-third speed shift valve along the passage 378 via the sixth port 270.

At this point, since the first solenoid valve S1 is controlled to be turned ON, the valve spool 312 of the second-third speed shift valve 44 moves leftward.

At this state, since the fourth land 318 is located at the left side of the second port 294 and the fifth land 320 is located at the right side of the fifth port 300, the second and fifth ports 294 and 300 communicate with each other.

Accordingly, the torqued pressure flowing into through the second port 294 through the passage 378 is supplied to the third speed clutch valve 60 along the passage 56.

At this point, the torque control hydraulic pressure supplied to the third speed clutch valve 60 acts on the first land 470 of the valve spool 472 supported by the elastic member 476 as shown in FIG. 2D so that the valve spool 472 moves rightward.

As a result, the first land 470 is located at the right side of the second port 460 to communicate the first port 456 with the second port 460, whereby the torque control hydraulic pressure flowing into through the first port 456 is supplied to the third friction element 58 through the passage 468 to actuate this friction element.

At this point, a portion of the hydraulic pressure flowing out through the second port of the third speed clutch valve 60 stands by the fourth port 328 of the third-fourth speed shift valve 46 along the passage 458.

Figure 7:
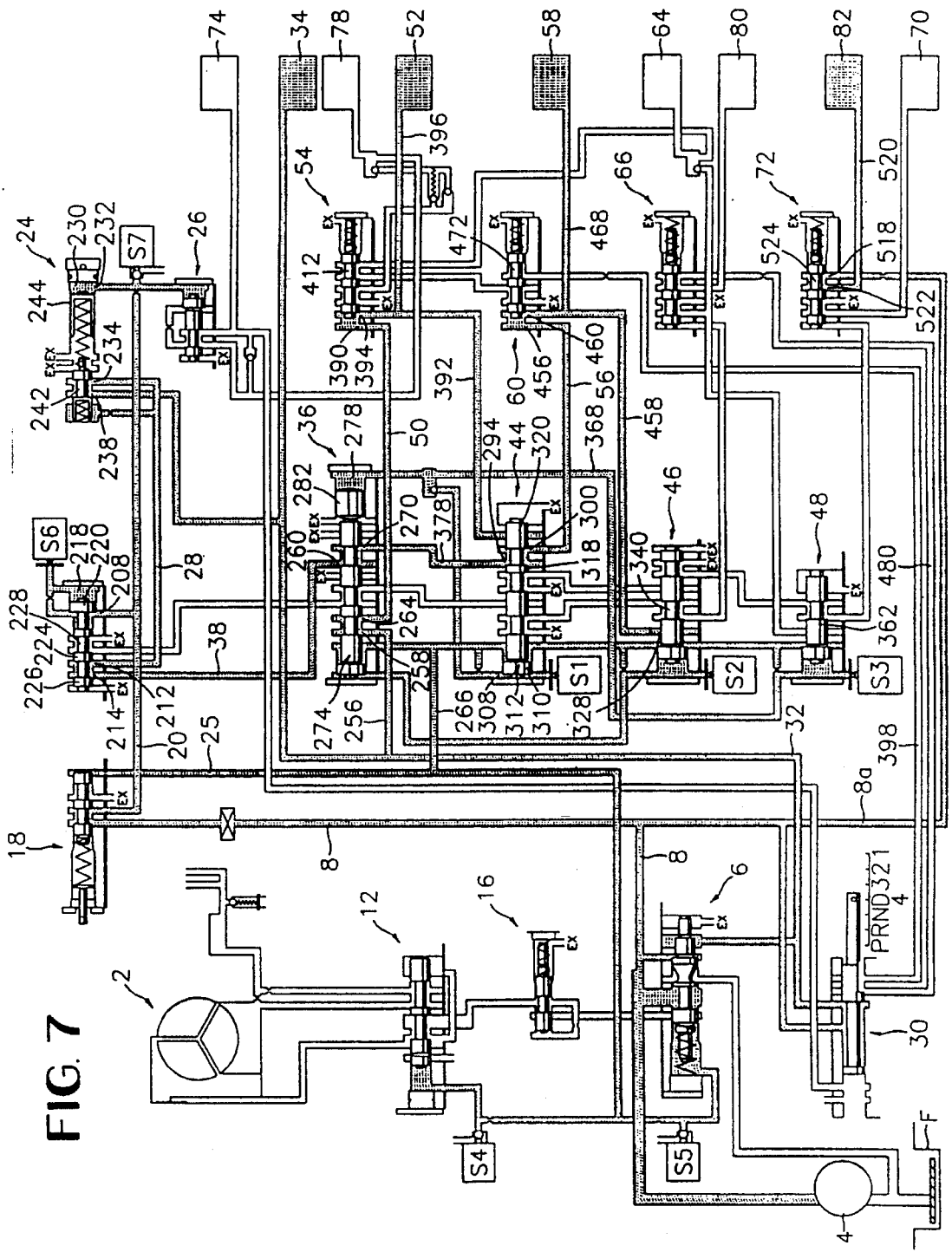
FIG. 7 is the hydraulic circuit diagram showing a formation of the hydraulic pressure at a second-third speed up-shift of the drive "D" range of the hydraulic control system for the automatic transmission according to the present invention.

At this state, the first, second and eighth friction elements 34, 52 and 82 are actuated by the drive hydraulic pressure, and the third friction element 58 is actuated by the torque control hydraulic pressure as shown in FIG. 7.

"THIRD SPEED OF DRIVE "D" RANGE"

When the second-third speed up-shift is completed, the first solenoid valve S1 is controlled to be turned ON by the transmission control unit to interrupt the hydraulic pressure.

At this point, since the hydraulic pressure formed within the pressure detecting chamber 308 of the second-third speed shift valve 48 acts on the first land 310, the valve spool 312 moves rightward such that the fourth land 318 is located at the right side of the second port 294 and the third land 316 is located at the left side of the eighth port 306, whereby the second port communicates with the eighth port 306 and does not communicate with the fifth port 300. Further, the fifth port 300 communicates with the fourth port 298 connected to the passage 392 which is for transmitting the drive hydraulic pressure.

Figure 8:
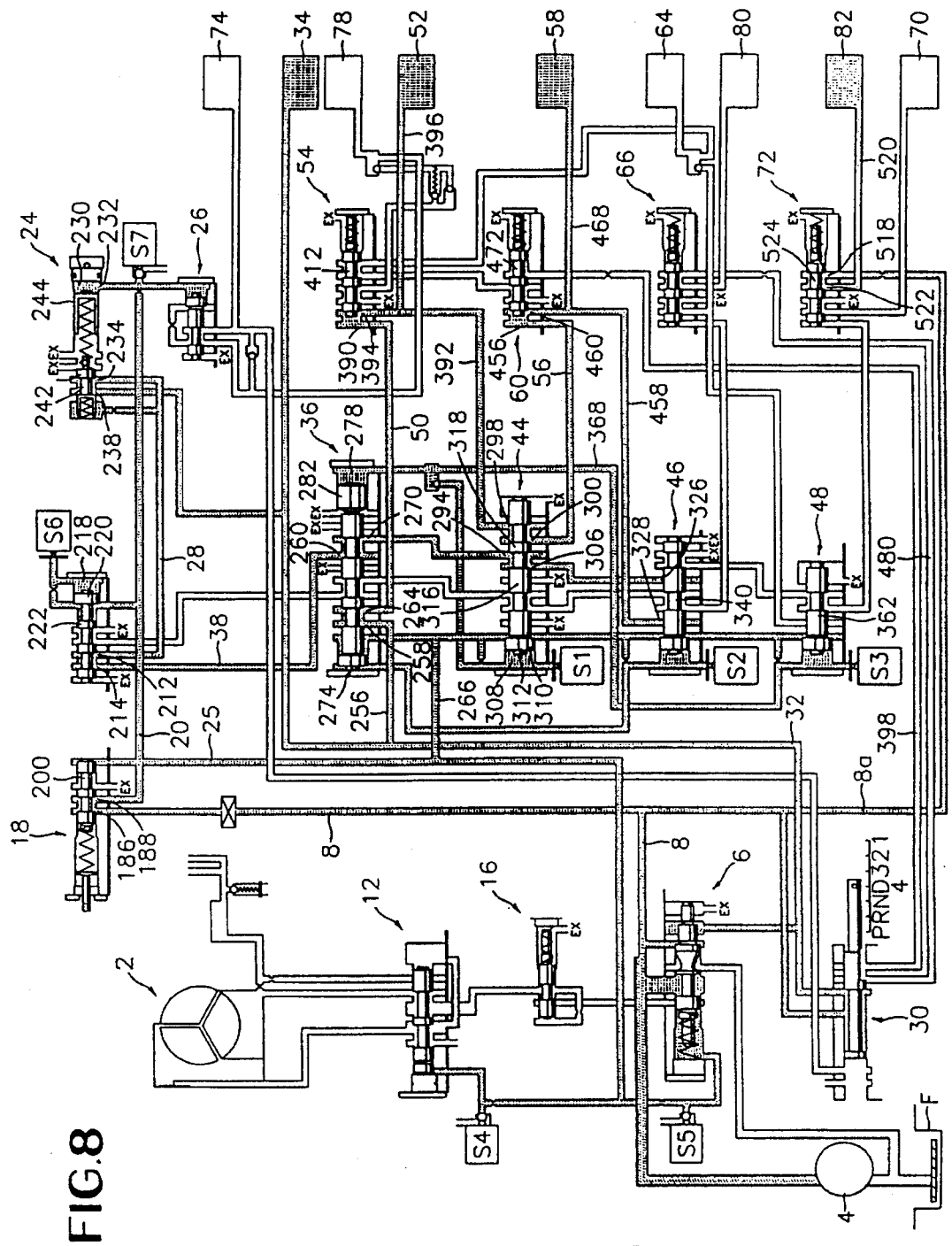
FIG. 8 is the hydraulic circuit diagram showing a formation of the hydraulic pressure at a third speed of the drive "D" range of the hydraulic control system for the automatic transmission according to the present invention.

As a result, the third speed clutch valve 60 which was receiving the torque control hydraulic pressure receives the drive hydraulic pressure through the first port 456 so as to actuate the third friction element 58 with the drive hydraulic pressure in the same manner as described above. (See FIG. 8)

At this point, the torque control hydraulic pressure supplied to the second-third speed shift valve 44 through the second port 294 stands by the third port 326 of the third-fourth speed shift valve 46 through the eighth port 306 communicating with the second port 294.

As described above, at the third speed of the drive "D" range, the first, second, third, and eighth friction elements 34, 52, 58 and 82 are actuated by the drive hydraulic pressure. At this point, the operation of the power train will be described in below.

That is, the rotating power of the input shaft X1 is transmitted to the first planetary gear unit 606 through the first friction element 34 and carrier 628 of the second planetary gear unit 608 through the third friction element 58 as well as the annulus gear 614 of the first planetary gear unit 606. Accordingly, the first planetary gear unit 606 transmits the torque of 1:1 to the output drum 622 without the change of the torque.

At this point, although the second friction element 52 is actuating, since the one-way clutch F3 can not operate as a reaction element, the sun gear 624 rotates in the clockwise direction.

This rotating power is transmitted to the sub-transmission part 630 through the chain member 634 and then to the differential unit 652 through the same drive transmittal path as that of the first speed, such that the third speed is accomplished.

"THIRD-FOURTH SPEED UP-SHIFT OF DRIVE "D" RANGE"

When the vehicle speed is gradually increased and thereby the open degree of the throttle valve is increased in the state of the third speed, the transmission control unit controls the fifth solenoid valve S5 to suspend the variation of the line pressure, and then controls the seventh solenoid valve S7 with low duty ratio to reduce the torque control hydraulic pressure to zero, thereby initiating the speed change.

Further, the sixth solenoid valve S6 is controlled to be turned "ON" by the transmission control unit, such that the hydraulic pressure within the pressure detecting chamber 218 of the control switch valve 22 is reduced to move the valve spool 228 rightward.

At this state, the seventh solenoid valve S7 is controlled with low duty ratio by the transmission control unit.

Accordingly, since the hydraulic pressure within the pressure detecting chamber 230 of the torque control regulator valve 24 is increased, the valve spool and valve plug 242 and 244 move leftward so that the fourth port 238 connected to the drive hydraulic pressure passage 32 and the second port 234 connected to the torque control hydraulic pressure passage 28 communicate with each other to supply the torque control hydraulic pressure to the third port 212 of the control switch valve 22.

At this point, since the third port 212 of the control switch valve 22 communicates with the fifth port 216, the torque control hydraulic pressure is supplied to the third port 262 of the first-second speed shift valve 36 through the second torque control hydraulic pressure passage 40. Further, since all of the solenoid valves S1, S2 and S3 are controlled to be turned OFF, the third and seventh ports 262 and 272 of the first-second speed shift valve 36, the third and seventh ports 296 and 304 of the second-third speed shift valve 44 and the second and fifth ports 324 and 330 of the third-fourth speed shift valve 46 become communicate with each other, respectively. Accordingly, the torque control hydraulic pressure supplied to the third port 262 of the first-second speed shift valve 36 is supplied to the fourth band valve 66 along the passage 62 through the fifth port 330 of the third-fourth speed shift valve 46.

At this point, since the valve spool 500 of the fourth speed band valve 66 is elastically supported by the elastic member 506 as shown in FIG. 2D, the valve spool 500 moves rightward by the hydraulic pressure flowing into through the first port 484 along the passage 62.

The first land 502 of the valve spool 500 is to be located at the right side of the second port 488, such that the torque control hydraulic pressure flowing into through the first port 484 is supplied to the fourth friction element 64 through the second port 488 to actuate the fourth friction element 64.

Further, a portion of the torque control hydraulic pressure flowing out through the second port 488 is supplied to the third port 352 of the fourth-fifth speed shift valve 48 through the passage 486 and stands by.

Figure 9:
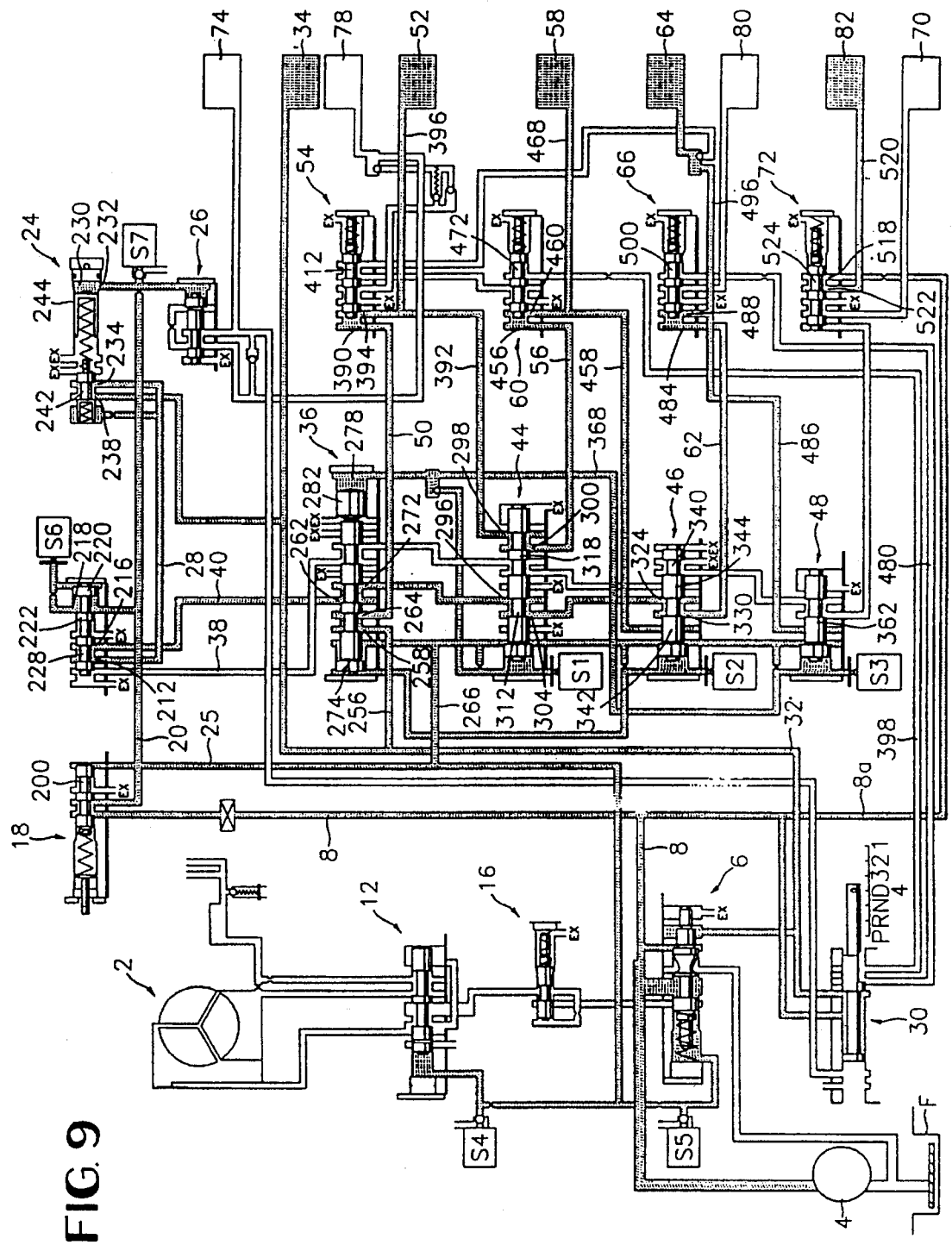
FIG. 9 is the hydraulic circuit diagram showing a formation of the hydraulic pressure at a third-fourth speed up-shift of the drive "D" range of the hydraulic control system for the automatic transmission according to the present invention.

At this state, the first, second, third and eighth friction elements 34, 52, 58 and 82 are actuated by the drive hydraulic pressure, and the fourth friction element 64 is actuated by the torque control hydraulic pressure, whereby the formation of the hydraulic pressure is of FIG. 9.

"FOURTH SPEED OF DRIVE "D" RANGE"

When the third-fourth speed up-shift is accomplished, the second solenoid valve S2 is controlled to be turned ON by the transmission control unit to exhaust the hydraulic pressure from the third-fourth speed shift valve 46.

At this point, since the hydraulic pressure within the pressure detecting chamber 336 of the third-fourth speed shift valve 46 is disappeared, the left pressure acting face of the first land 338 does not receive the hydraulic pressure and the right pressure acting face of the first land 338 receives the hydraulic pressure flowing into the first port 332, whereby the valve spool 340 moves leftward.

Accordingly, the second and third lands 342 and 344 of the third-fourth speed shift valve 46 are located at the left side of the fourth port 328 and the right side of the fifth port 330, respectively, such that the fourth and fifth ports 328 and 330 communicate with each other.

Figure 10:
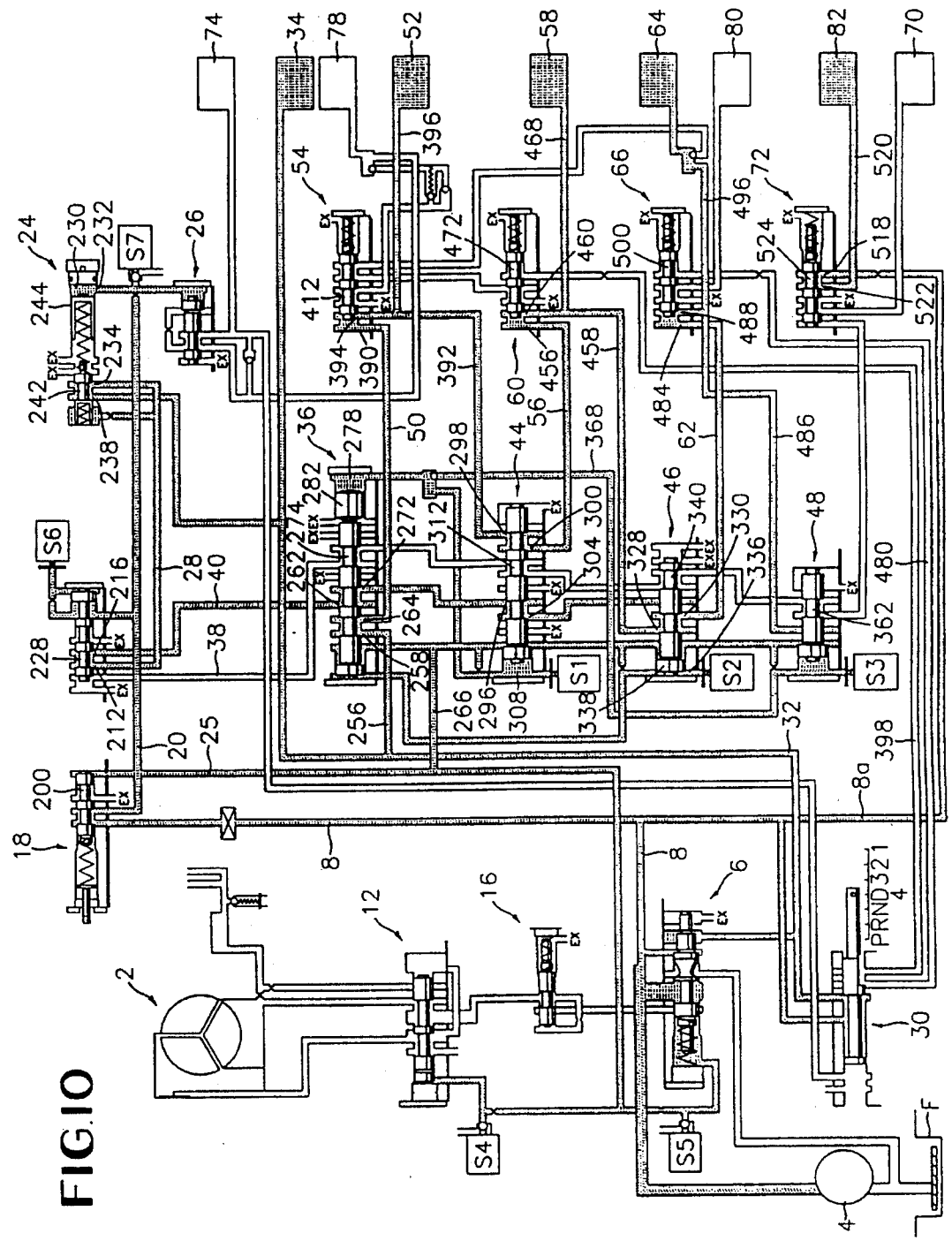
FIG. 10 is the hydraulic circuit diagram showing a formation of the hydraulic pressure at a fourth speed of the drive "D" range of the hydraulic control system for the automatic transmission according to the present invention.

The torque control hydraulic pressure which is supplied to the fourth speed band valve 66 through the second and fifth ports 324 and 330 of the third-fourth speed shift valve 46 is to be interrupted and the drive hydraulic pressure which stands by the fourth port 328 of the third-fourth speed shift valve is to be supplied to the fourth speed band valve 66 through the passage 62, whereby the fourth friction element which was actuated by the torque control hydraulic pressure is to be actuated by the drive hydraulic pressure as shown in FIG. 10.

As described above, the first, second, third, fourth and eighth friction elements 34, 52, 58, 64 and 82 is to be actuated by the drive hydraulic pressure at this fourth speed and the operation of the power train will be described in below with FIG. 3.

That is, the rotating power transmitted to the input shaft X1 is transmitted to the carrier 628 of the second planetary gear unit 608 through the third friction element 58. Since the sun gear 624 of the second planetary gear unit 608 is fixed by the fourth friction element 64, the annulus gear 618 of the second planetary gear unit 608 is to rotate faster than that of the input.

Accordingly, the annulus gear 618 of the second planetary gear unit 608 rotates with increased speed and this increased rotation speed is transmitted to the drive sprocket 620 through the output drum 622.

At this point, the sun gear 610 of the first planetary gear unit 606 is to rotate faster than that of the input shaft X1, the one-way clutch is to slip, whereby the power is not transmitted to the first friction element 34.

Further, the rotating power transmitted to the drive sprocket 620 is transmitted to the sub-transmission part 630 and then transmitted to the differential system 652 through the third planetary gear unit 636 via the same path as that of the third speed.

At the fourth speed of the drive "D" range, the engine brake is operated, the rotating power in the clockwise direction is transmitted to the annulus gear 644 of the third planetary gear unit 636 and then transmitted to the driven sprocket through the eighth friction element 82. Further the rotating power is transmitted to the drive sprocket 620 of the main-transmission part 600 through the chain member 634 and then is transmitted to the engine along the input shaft X1.

"FOURTH-FIFTH SPEED UP-SHIFT OF DRIVE "D" RANGE"

When the vehicle speed is gradually increased and thereby the open degree of the throttle valve is increased in the state of the fourth speed, the transmission control unit controls the fifth solenoid valve S5 to suspend the variation of the line pressure, and then controls the seventh solenoid valve S7 with height duty ratio to reduce the torque control hydraulic pressure to zero, thereby initiating the shift.

Further, the sixth solenoid is controlled to be turned OFF to increase the hydraulic pressure within the pressure detecting chamber 218 of the control switch valve 22, such that the valve spool 228 moves leftward.

Accordingly, the third port 212 receiving the torque control hydraulic pressure from the torque control hydraulic pressure passage 28 communicates with the fourth port 214. At this point, the seventh solenoid valve S7 is controlled to be turned OFF by the transmission control unit to increase the torque control hydraulic pressure, such that the each valve plug 242 and 244 of the first and second valve spools moves rightward.

Further, the first and third solenoid valves S1 and S3 are controlled to be turned OFF and the second solenoid valve S2 is controlled to be turned ON. At this state, the drive hydraulic pressure supplied from the drive hydraulic pressure passage 32 is supplied to the regulator valve 24 through the fourth port 238 and then to the torque control hydraulic pressure passage 28 through the second port 234 communicating with the fourth port 238.

The torque control hydraulic pressure flowing along the torque control hydraulic pressure passage 28 flowing into the control switch valve through the third port 212 and then is supplied to the first-second speed shift valve 36 through the fourth port 214 communicating with the third port 212 along the first torque control hydraulic pressure passage 38.

At this point, since the second solenoid valve S2 of the first-second speed shift valve 36 is controlled to be turned ON and the third solenoid valve S3 is controlled to be turned OFF, the control pressure transmitted to the passage 376 through the second branch passage 266 from the control passage 25 is supplied to the pressure detecting chamber 278 of the first-second speed shift valve 36, such that the valve spool 274 moves leftward.

Figure 11:
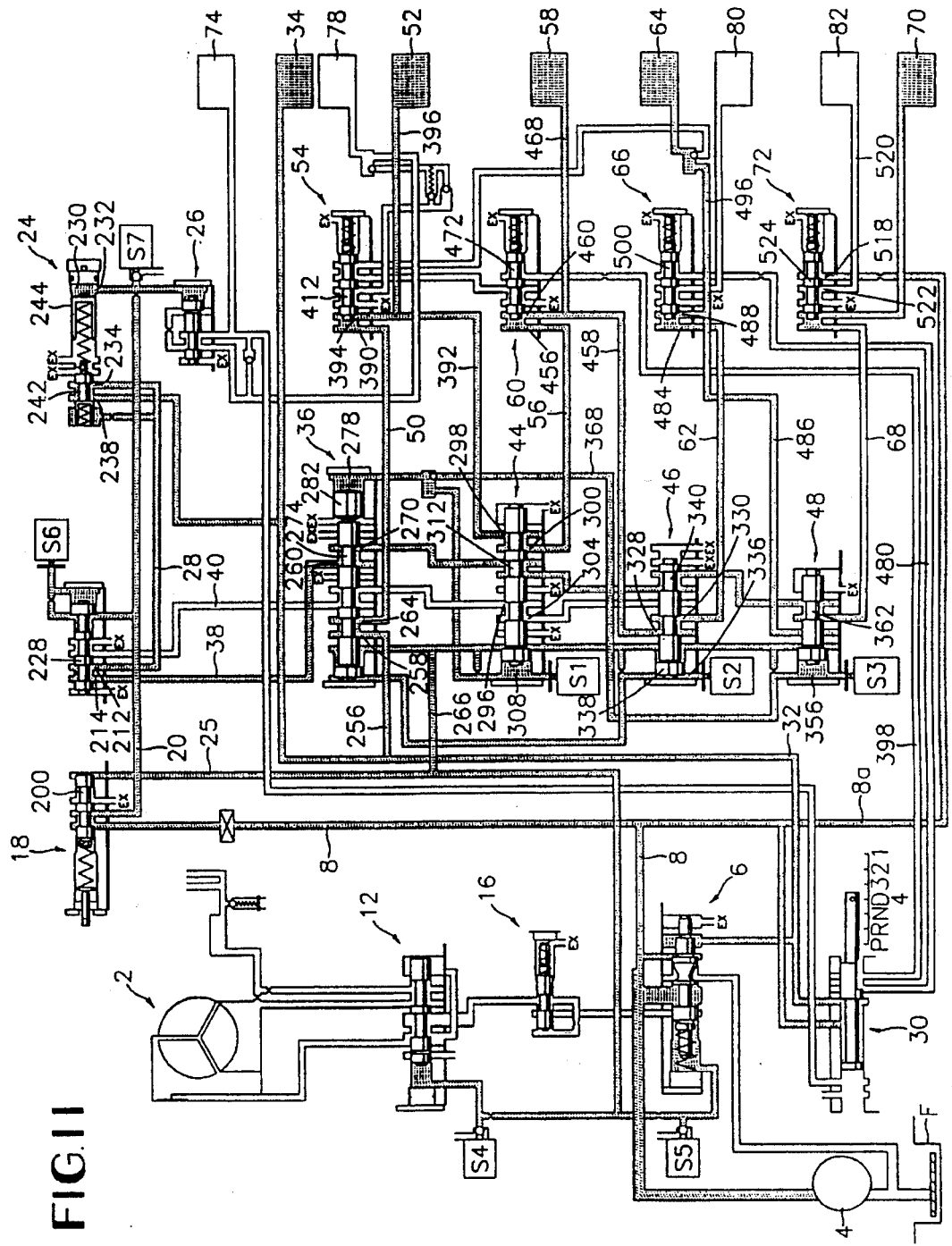
FIG. 11 is the hydraulic circuit diagram showing a formation of the hydraulic pressure at a fourth-fifth speed up-shift of the drive "D" range of the hydraulic control system for the automatic transmission according to the present invention.

Accordingly, the torque control hydraulic pressure transmitted along the first torque control hydraulic pressure passage 38 flows into through the second port 260 and then is supplied to the second port 294 of the second-third speed shift valve 44 along the passage 378 through the sixth port 270 as shown in FIG. 11.

At this point, the valve spool 312 of the second-third speed shift valve 44 moves rightward in accordance with increasing the hydraulic pressure within the pressure detecting chamber 308 since the firs solenoid valve S1 is controlled to be turned OFF.

Accordingly, the second and eighth ports 294 and 306 of the second-third speed shift valve 44 communicate with each other, such that the torque control hydraulic pressure flows out through the eighth port 306 and is transmitted to the third port 326 of the third-fourth speed shift valve 46 along the passage 384.

At this point, since the solenoid valve S2 is controlled to be turned OFF, the hydraulic pressure acting on the right face of the first land 338 of the valve spool 430 of the third-fourth speed shift valve 46 becomes larger than that of the left face of the first land 338. Accordingly, the valve spool 340 moves leftward to communicate the third and seventh ports 326 and 334 with each other, whereby the torque control hydraulic pressure flowing into through the third port 326 is supplied to the second port of the fourth-fifth speed shift valve 48 through the passage 386.

The valve spool 362 of the fourth-fifth speed shift valve 48 receiving the torque control hydraulic pressure through the second port 350 is moved rightward by increase of the hydraulic pressure within the pressure detecting chamber 356 since the third solenoid valve S3 is controlled to be turned OFF.

Accordingly, the second and fourth ports 350 and 354 of the fourth-fifth speed shift valve 48 communicate with each other to supply the torque control hydraulic pressure to the passage 386. The hydraulic pressure supplied to the passage 386 is supplied to the pressure control chamber 510 of the overdrive unit valve 72 through the first port 512 and torque control hydraulic pressure passage 68.

As a result, the valve spool 524 elastically supported by the elastic member 530 moves rightward when the hydraulic pressure acting on the right face of the first land 526 becomes larger than the elastic force such that the first and second ports 512 and 516 communicate with each.

Accordingly, the torque control hydraulic pressure supplied through the passage 68 is supplied to the fifth friction element 70 through the passage 514 to actuate the fifth friction element 70. By this operation, at the fourth speed, the line pressure is interrupted which is supplied to the eighth friction element via the passage 8a, and third and fourth ports 518 and 522.

As described above, the fifth friction element 70 is actuated by the torque control hydraulic pressure and, at the same time, the first friction element 34 receives the drive hydraulic pressure from the drive hydraulic pressure passage 32 and thereby actuates, and the drive hydraulic pressure is supplied to the second friction element 52 through the first and fourth ports 258 and 264 of the first-second speed shift valve 36. Further, a portion of the drive hydraulic pressure supplied to the second speed clutch valve 54 is supplied to the third friction element 58 through the second-third speed shift valve 44 and the third speed clutch valve 60, and a portion of the drive hydraulic pressure supplied to the third speed clutch valve 60 is supplied to the fourth friction element 64 through the third-fourth speed shift valve 46 and the fourth speed band valve 66.

That is, at the fourth-fifth speed up-shift, the fifth friction element is actuated by the torque control hydraulic pressure, and the first, second, third and fourth friction elements 34, 52, 58 and 64 are actuated by the drive hydraulic pressure.

"FIFTH SPEED OF DRIVE "D" RANGE"

When the fourth-fifth speed up-shift is completed, the third solenoid valve S3 is controlled to be turned ON by the transmission control unit to reduce the hydraulic pressure within the pressure detecting chamber 356 of the fourth-fifth speed shift valve 48.

As a result, the hydraulic pressure supplied along the passage 376 connected to the second branch passage 266 does not act on the left side of the first land 360 but acts on the right side of the first land such that the valve spool 362 moves leftward.

Accordingly, the second and fourth ports 350 and 354 which were communicated with each other at the fourth-fifth speed up-shift is to be interrupted and the third and fourth ports 352 and 354 communicate with each other.

At this state, the drive hydraulic pressure which stands by the third port 352 of the fourth-fifth speed shift port 48 along the passage 486 through the second port 488 of the fourth speed band valve 66 at fifth-fourth speed up-shift is supplied to the overdrive unit valve 72 through the fourth port 354.

The drive hydraulic pressure flowed into the pressure detecting chamber of the overdrive unit valve 72 through the first port 512 acts on the left face of the first land 526 of the valve spool 524 to move the valve spool 524 rightward and then is supplied to the fifth friction element 70 along the passage 514 through the second port 516.

Figure 12:
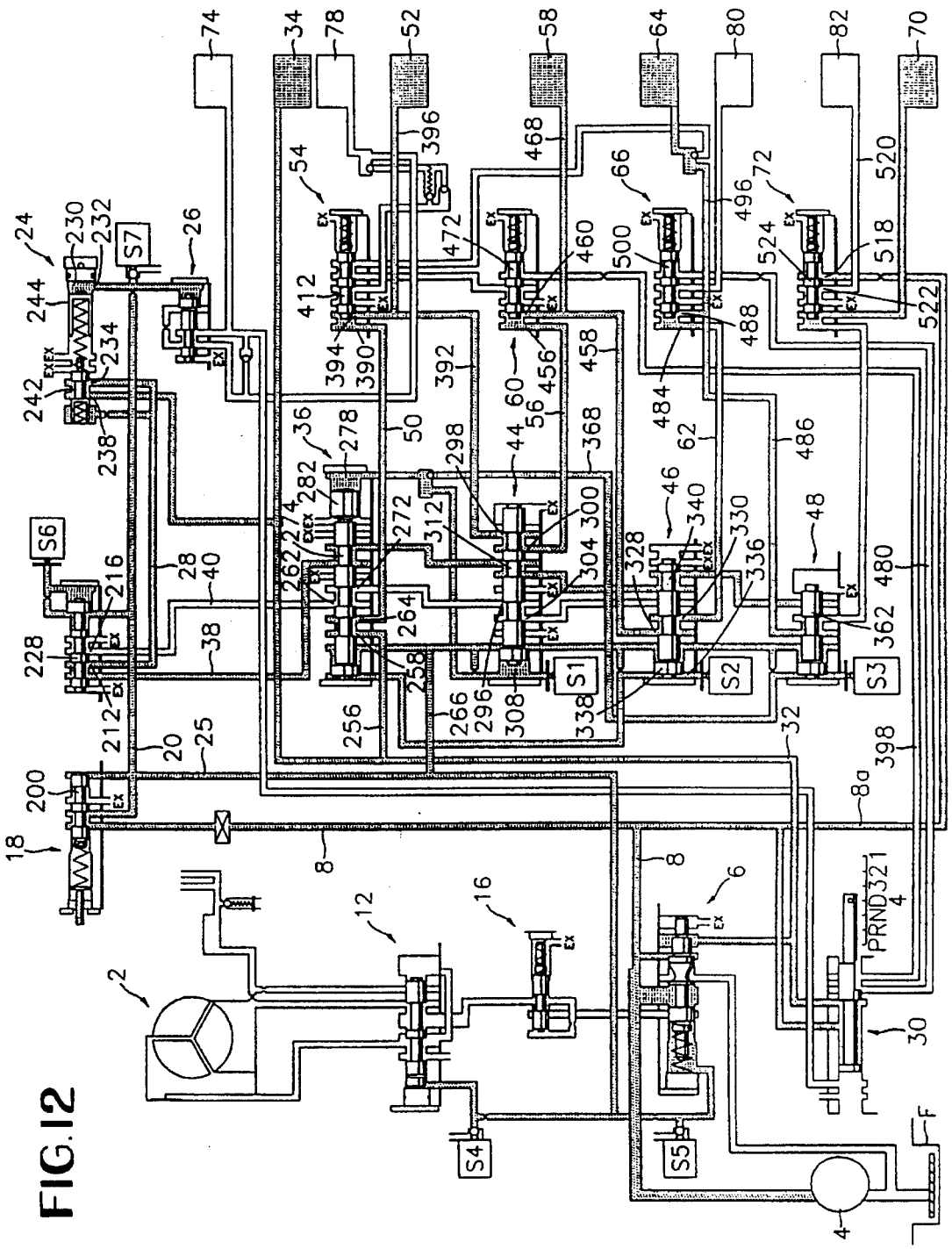
FIG. 12 is the hydraulic circuit diagram showing a formation of the hydraulic pressure at a fifth speed of the drive "D" range of the hydraulic control system for the automatic transmission according to the present invention.

That is, the fifth friction element which was actuated by the torque control hydraulic pressure is actuated by the drive hydraulic pressure as shown in FIG. 12.

At this point, the operation of the power train will be described in below with the FIG. 3.

That is, the driving power transmitted to the input shaft X1 is transmitted from the main transmission part 600 to the sub-transmission part 630 to rotate the driven sprocket 632.

At this point, the rotating power of the driven sprocket 632 is transmitted to the planet gear through the carrier 638 of the third planetary gear unit 636. the sun gear 640 of the third planetary gear unit 636 is fixed by the fifth friction element 70 so that the planet gear 642 rotates on its axis and revolves around the sun gear 640.

By this operation, the rotation on its axis of the planet gear 642 is added to the annulus gear 644 so that the annulus gear 644 rotates faster than of the fourth speed and this rotation is transmitted to the differential system 652, whereby the fifth speed is accomplished. This fifth speed is accomplished only when the overdrive switch is turned ON.

Accordingly, if the overdrive switch is turned OFF, the automatic speed shift is accomplished to the fourth speed. (See the table of FIG. 18)

The first through the fifth speeds is described hereinabove, and according to the embodiment of the present invention, when the speed shift is initiated, the friction element is actuated by the torque control hydraulic pressure and, shortly after that, the friction element is actuated by the drive hydraulic pressure instead of the torque control hydraulic pressure, such that the response to the speed shift is improved and the skip shift is possible.

The skip shift is that the speed shift is not accomplished in order but is to improve the response to the speed shift, for example, the speed shift from the second speed to the fourth speed or the fourth speed to the second speed. The skip shift will be described in below.

"SECOND-FOURTH SPEED SKIP SHIFT IN "D" RANGE"

In the state of the second speed, when rapidly stepping the axel pedal, transmission control unit detects this and controls the fifth solenoid valve S5 to suspend the regulation of the line pressure. Further, the torque control hydraulic pressure is reduced to zero by the seventh solenoid valve S7 which is controlled with high duty ratio by the transmission control unit.

And at the same time, the sixth solenoid valve S6 is controlled to be turned OFF to increase the hydraulic pressure within the pressure detecting chamber 218 of the control switch valve 22.

By this control, the valve spool 228 moves leftward to communicate the third and first ports 212 and 214 with each other.

Accordingly, the hydraulic pressure flowing along the passage 28 from the torque control regulator valve 24 is supplied to the second port 260 of the first-second shift valve through the first torque control hydraulic pressure passage 38.

At this point, since the solenoid valve S2 is controlled to be turned ON to exhaust the hydraulic pressure within the pressure detecting chamber 276 and the solenoid valve S3 is controlled to be turned OFF to increase the hydraulic pressure within the pressure detecting chamber 278, the valve spool 274 of the first-second moves leftward.

As a result, since the first and second ports 258 and 260 of the first-second speed shift valve communicate with the fourth and sixth ports 264 and 270 of the first-second speed shift valve, respectively, the torque control hydraulic pressure flowing into through the second port 260 is supplied to the second port 294 of the second-third speed shift valve 44 through the passage 378 and the drive hydraulic pressure supplied from the first branch passage 256 branched from the drive hydraulic pressure passage 32 is supplied to the first port 390 of the second clutch vale 54 through the passage 50.

Further, the torque control hydraulic pressure supplied to the second port 294 of the second-third speed shift valve 44 is supplied to the first port 456 of the third speed clutch valve 60 along the passage 56 through the second and fifth ports 294 and 300 which communicate with each other since the solenoid valve is controlled to be turned ON.

The hydraulic pressure supplied to the first port 456 increases the hydraulic pressure within the pressure detecting chamber 454 and this hydraulic pressure acts on the left face of the first land 470 of the valve spool 472 to move the valve spool 472 to the rightward.

At this point, the elastic member 476 of the third speed clutch valve 60 is compressed to move the valve spool 472. Accordingly, since the first and second ports 456 and 460 of the third speed clutch valve 60 is to communicate with each other, a portion of the torque control hydraulic pressure supplied through the passage 56 is supplied to the fourth port 328 of the third-fourth speed shift valve 46 through the torque control hydraulic pressure passage 458 and the other portion of the torque control hydraulic pressure is supplied to the third friction element 58 through the passage 468.

The hydraulic pressure of the pressure detecting chamber 336 of the third-fourth speed shift valve 46 receiving the torque control hydraulic pressure through the fourth port 328 is reduced to release the hydraulic pressure which was acting on the left face of the first land 338 since the solenoid valve S2 is controlled to be turned ON and the hydraulic pressure of the second branch passage 266 branched off from the control passage 42 acts on the right face of the first land 338. Accordingly, the valve spool 340 moves leftward.

As a result, the fourth and fifth ports 328 and 330 of the third-fourth speed shift valve 46 is to communicate with each other such that the torque control hydraulic pressure supplied to the fourth port 328 is supplied to the first port 484 of the fourth speed band valve 66 through the passage 62.

Accordingly, the hydraulic pressure within the pressure control chamber 482 of the fourth speed band valve 66 is increased such that the hydraulic pressure acts on the left side of the first land 502 of the valve spool 500 to move the valve spool 500 rightward while compressing the elastic member 506.

As a result, the first and second ports 484 and 488 of the fourth speed band valve 66 communicate with each such that the torque control hydraulic pressure is supplied to the third port 352 of the fourth-fifth speed shift valve 48 and to the fourth friction element 64 through the passage 496 to actuate the fourth friction element 64.

As described above, the third and fourth friction elements 58 and 64 is actuated by the torque control hydraulic pressure. Since the first and second ports 390 and 394 of the second speed clutch valve 54, the drive hydraulic pressure supplied through the passage 50 from the first-second speed shift valve 36 is supplied to the second friction element 52.

Figure 13:
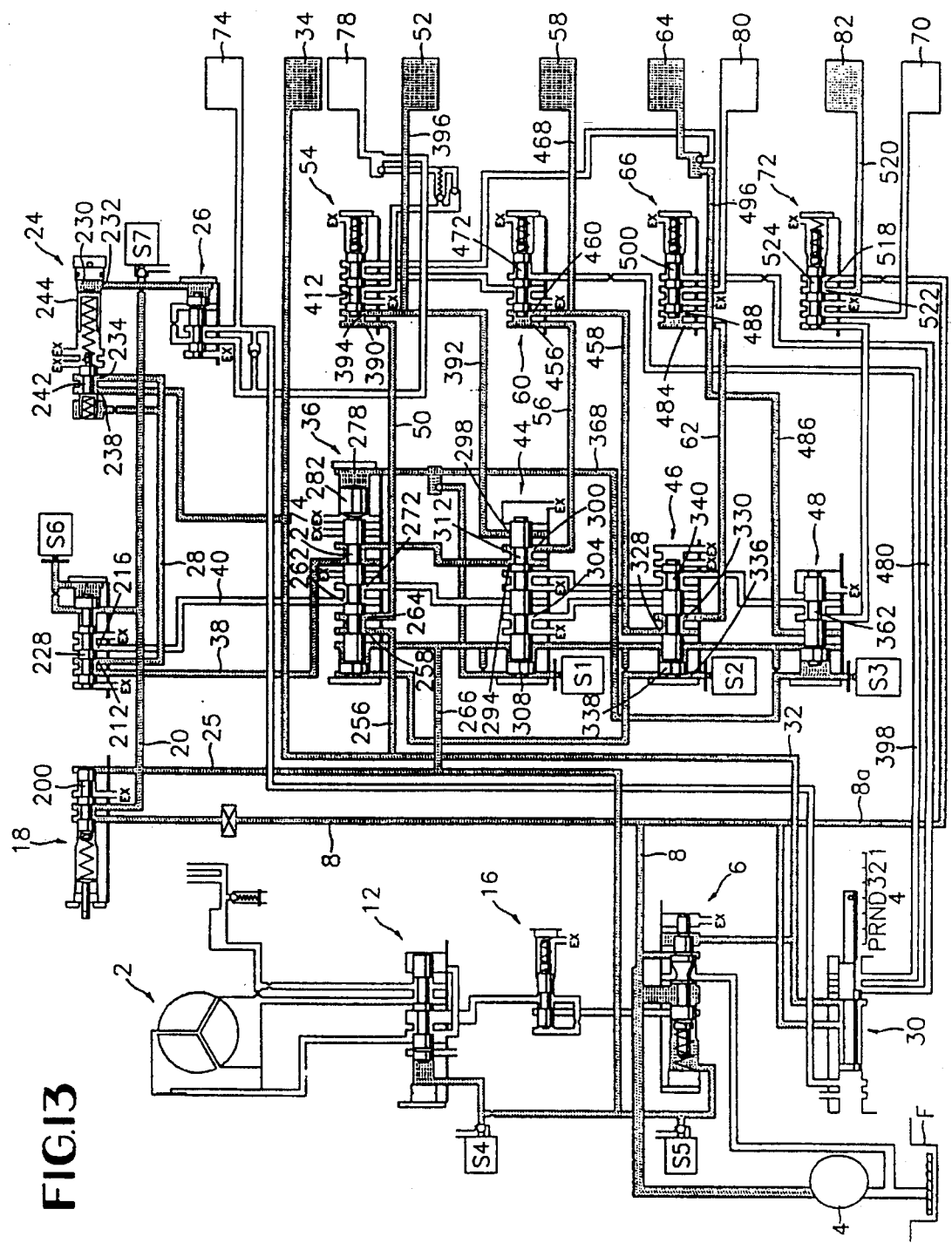
FIG. 13 is the hydraulic circuit diagram showing a formation of the hydraulic pressure at a second-fourth speed skip shift of the drive "D" range of the hydraulic control system for the automatic transmission according to the present invention.

Further, a portion of the hydraulic pressure supplied to the torque control regulator valve 24 through the drive hydraulic pressure passage 32 is directly supplied to the first friction element 34 and the line pressure within the passage 8a is supplied to the third port 518 of the overdrive unit valve 72 and thereby is supplied to the eighth friction element 82 along the passage 520 through the fourth port 522 communicating with the third port 518 of the overdrive unit valve 72. As a result, the second-fourth speed skip shift is realized as shown in FIG. 13.

When the speed shift as described above is completed, the sixth solenoid valve is controlled to be turned ON and the first solenoid valve S1 is controlled to be turned OFF by the transmission control unit, whereby the friction element is actuated by the drive hydraulic pressure which formes the fourth speed hydraulic circuit.

"SECOND-FIFTH SPEED SKIP SHIFT IN "D" RANGE"

In the state of the second speed, when a steep increase signal of the open range of the throttle valve is transmitted to the transmission control unit, the transmission control unit controls the fifth solenoid valve S5 to suspend the regulation of the line pressure and controls the seventh solenoid valve S7 with high duty ratio to reduce the torque control hydraulic pressure to zero, thereby initiating the skip shift.

At this point, sixth solenoid valve S6 is controlled to be turned OFF so that the third port 212 of the control switch valve 22 communicates with the fourth port 214 like during the second-fourth skip shift.

As a result, the torque control hydraulic pressure supplied from the torque control hydraulic pressure passage 28 is supplied to the first-second speed shift valve 36 and the transmission control unit controls the solenoid valves S2 and S3 to be turned ON, whereby each valve spool 274, 312, 340 and 362 of first-second, second-third, third-fourth and fourth-fifth speed shift valves 36, 44, 46 and 48 is moved leftward.

Accordingly, in the first-second speed shift valve 36, the first and second ports 258 and 260 communicate with the fourth and sixth 264 and 270, respectively. In the second-third speed shift valve 44, the second port 294 communicate with the fifth port 330. In the third-fourth speed shift valve 46, the fourth port 328 communicates with the fifth port 330 and in the fourth-fifth speed shift valve 48, the third port 352 communicates with the fourth port 354.

As a result, the torque control hydraulic pressure flowing into the second port 260 of the first-second speed shift valve 36 is supplied to the second port 294 of the second-third speed shift valve 44 through the torque control hydraulic pressure passage 378 and thereby supplied to the first port 456 of the third speed clutch valve 60 along the passage 56 through the fifth port 300 communicating with the second port 294.

The first and second ports 456 and 460 of the third speed clutch valve 60 are to communicate with each other by the torque control hydraulic pressure such that a portion of the torque control hydraulic pressure is supplied to the fourth port 328 of the third-fourth speed shift valve 46 along the passage 458 and the other portion of the torque control hydraulic pressure is supplied to the third friction element 58.

Further, the torque control hydraulic pressure supplied to the fourth port 328 of the third-fourth speed shift valve 46 is supplied to the first port 484 of the fourth speed band valve 66 along the passage 62 through the fifth port 330 communicating with the fourth port 328, thereby moving the valve spool 500 rightward to communicate the first port 484 with the second port 488.

Accordingly, a portion of the torque control hydraulic pressure supplied to the first port 484 is supplied to the fourth friction element 64 and the other portion of the torque control hydraulic pressure is supplied to the third port 352 of the fourth-fifth speed shift valve 48.

The torque control hydraulic pressure supplied to the third port 352 of the fourth-fifth speed shift valve 48 is supplied to the first port 512 of the overdrive unit valve 72 along the passage 68 through the fourth port 354 communicating with the third port 352, thereby moving the valve spool 524 rightward to communicate the first port 512 with the second port 516.

As a result, the torque control hydraulic pressure supplied to the first port 512 of the overdrive unit valve 72 is supplied to the fifth friction element 70 along the passage 514 to actuate the fifth friction element 70.

Figure 14:
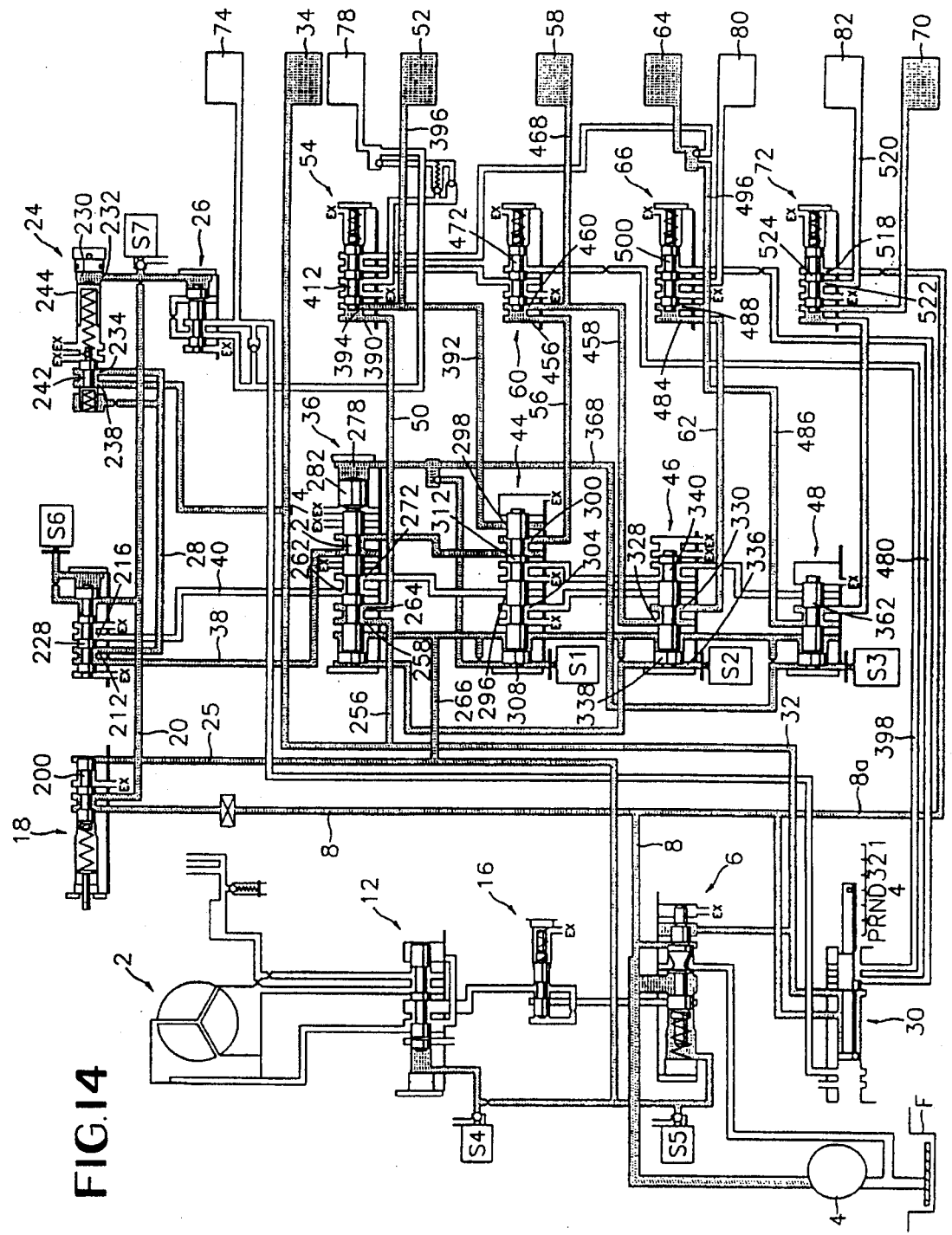
FIG. 14 is the hydraulic circuit diagram showing a formation of the hydraulic pressure at a second-fifth speed skip shift of the drive "D" range of the hydraulic control system for the automatic transmission according to the present invention.

Further, the first friction element 34 is actuated by the drive hydraulic pressure supplied from the drive passage 32. The second friction element 52 is actuated by the drive hydraulic pressure which is supplied to the passage 396 from the second speed clutch valve 54 receiving the hydraulic pressure through the first and fourth ports 258 and 264 of the first-second speed shift valve 36. Accordingly, the second-fifth speed skip shift is accomplished as shown in the diagram of hydraulic circuit of FIG. 14.

As described above, when the second-fifth speed skip shift is completed, the first solenoid valve S1 is controlled to be turned OFF by the transmission control unit to move the valve spool 312 rightward, such that the third, fourth and fifth friction elements 58, 64 and 70 are to be actuated by the drive hydraulic pressure.

After completion of the speed change, the fifth solenoid valve S5 is controlled to regulate the line pressure in a state of controlling the seventh solenoid valve S7 with low duty ratio.

"THIRD-FIFTH SPEED SKIP SHIFT IN "D" RANGE"

In the state of the third speed, when a steep increase signal of the open range of the throttle valve is transmitted to the transmission control unit, the transmission control unit controls the fifth solenoid valve S5 to suspend the regulation of the line pressure and controls the seventh solenoid valve S7 with high duty ratio to reduce the torque control hydraulic pressure to zero, thereby initiating the skip shift.

As a result, since the hydraulic pressure acting on the left face of the first land 220 of the control switch valve 22 becomes larger than that acting on the right face of the first land 220, the valve spool 228 moves rightward to communicate the third port 216 connected to the torque control hydraulic pressure passage 28 with the fifth port 216.

And at the same time, the third solenoid valve S3 is controlled to be turned ON to exhaust the hydraulic pressure within the pressure detecting chamber 356 of the fourth-fifth speed shift valve, such that the valve spool 362 moves leftward.

Accordingly, in the first-second speed shift valve 36, the first and third ports 258 and 262 communicate with the fourth and seventh 264 and 272, respectively. In the second-third speed shift valve 44, the third port 296 communicate with the seventh port 304. In the third-fourth speed shift valve 46, the second port 324 communicates with the fifth port 330 and in the fourth-fifth speed shift valve 48, the third port 352 communicates with the fourth port 354.

That is, all of the shift valves of the first shift control part 1 communicate with each other to form the passage which can supply the torque control hydraulic pressure. Accordingly, the torque control hydraulic pressure supplied from the fifth port 216 of the control switch valve 22 is supplied to the third port 262 of the first-second speed shift valve 36 through the second torque control hydraulic pressure passage 40 and thereby supplied to the passage 380 through the seventh port 272.

The torque control hydraulic pressure flowing along the passage 380 is supplied to the second-third speed shift valve 44 through the third port 296 and then to the third-fourth speed shift valve 46 through the second port 324. Further, the torque control hydraulic pressure supplied to the fourth speed band valve 66 of the first port 484 along the passage through the fifth port 330 of the third-fourth speed shift valve 46.

The torque control hydraulic pressure which is supplied to the first port 484 of the fourth speed band valve 66 acts on the left face of the first land 502 of the fourth speed band valve 66 to move the valve spool 500 rightward.

As a result, the first and second ports 484 and 488 communicate with each such that a portion of the torque control hydraulic pressure is supplied to the third port 352 of the fourth-fifth speed shift valve 48 through the passage 486 and the other portion of the torque control hydraulic pressure is supplied to the fourth friction element 64 through the passage 496 to actuate it.

Further, the torque control hydraulic pressure flowing into the fourth-fifth speed shift valve 48 through the third port 352 is supplied to the first port 512 of the overdrive unit valve 72 along the passage 68 through the fourth port 354 communicating with the third port 352.

At this point, the torque control hydraulic pressure flowing into the overdrive unit valve 72 through the first port 512 acts on the left face of the first land 526 of the valve spool 524 to move the valve spool 524 rightward. As a result, the first port 512 is to communicate with the second port 516 so that the torque control hydraulic pressure is supplied to the fifth friction element 70 along the passage 514 through the second port 516.

That is, the fourth and fifth friction elements 64 and 70 is actuated by the torque control hydraulic pressure. The drive hydraulic pressure flowing into the first-second speed shift valve 36 through the first port 258 is supplied to the second speed clutch valve 64 along the passage 50 through the 264.

The drive hydraulic pressure flowing into the second speed clutch valve 54 through the first port 390 acts on the left face of the first land 410 of the valve spool 412 to move the valve spool 412 rightward. As a result, the first port 390 is to communicate with the second port 394 so that the drive hydraulic pressure flowing into through the first port is supplied to the passages 392 and 396 through the port 394.

At this point, the drive hydraulic pressure flowing along the passage 396 actuates the second friction element 52 and the drive hydraulic pressure flowing along the passage 392 flows into the second-third speed shift valve 44 through the fourth port 298 and then into the third speed clutch valve 60 along the passage 56 through the fifth port 300 communicating with the fourth port 298.

The drive hydraulic pressure flowing into the third speed clutch valve 60 through the first port 456 acts on the left face of the first land 470 of the valve spool 472 to move the valve spool 472 rightward so that the first and second ports 456 and 460 communicate with each other.

As a result, the drive hydraulic pressure flowing into through the first port 456 is supplied to the passages 458 and 468 through the second port 460.

The drive hydraulic pressure flowing along the passage 458 flows into the third-fourth speed shift valve 46 through the fourth port 328 and stands by and the drive hydraulic pressure flowing along the passage 486 is supplied to the third friction element 58.

Further, the first friction element 34 is also actuated by the drive hydraulic pressure. Since the first friction element 34 is directly connected to the drive hydraulic pressure passage 32, when the shift lever is selected at the drive "D" range, the first friction element 34 is always actuated.

Figure 15:
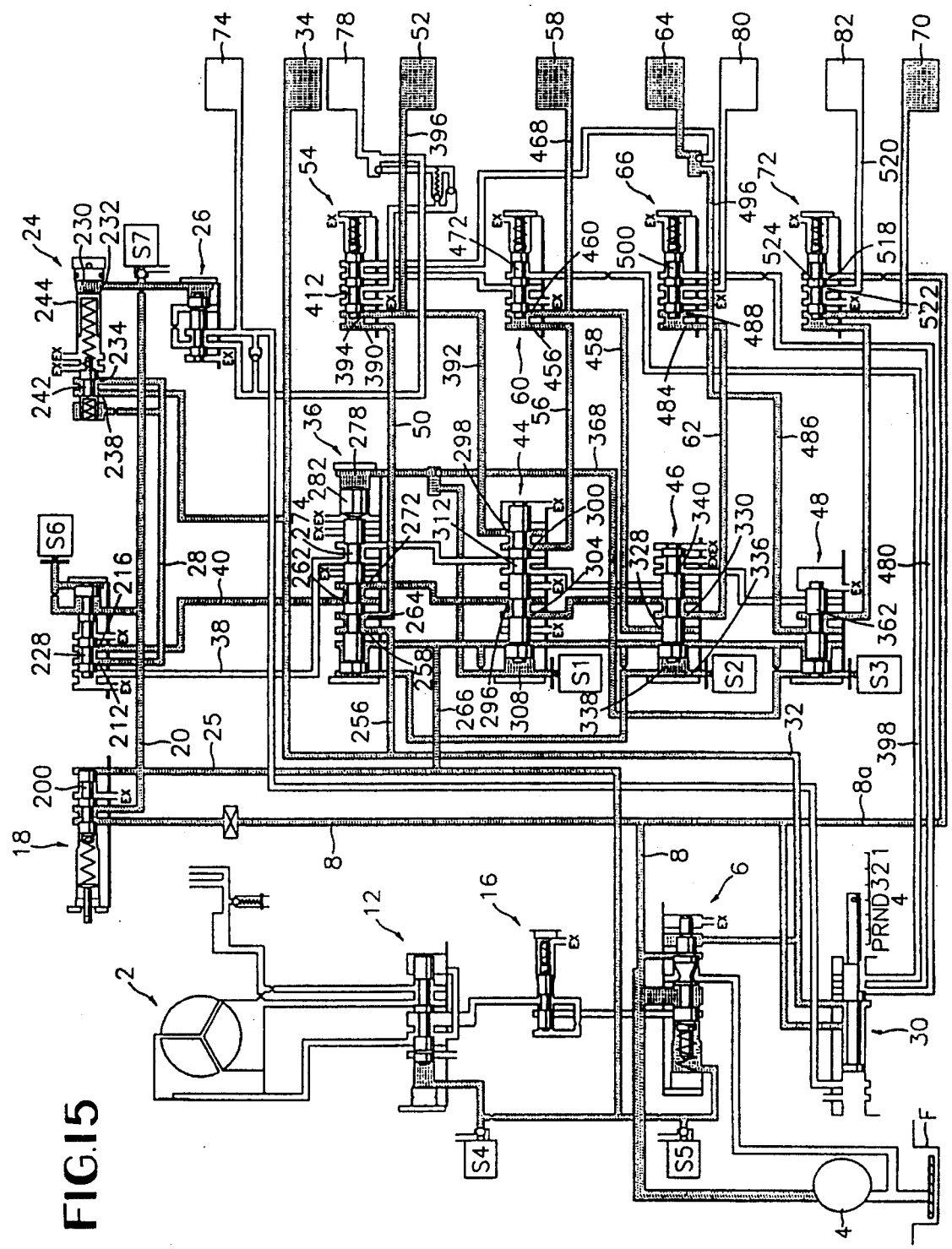
FIG. 15 is the hydraulic circuit diagram showing a formation of the hydraulic pressure at a third-fifth speed skip shift of the drive "D" range of the hydraulic control system for the automatic transmission according to the present invention.

As described above, the first, second and third friction elements 34, 52 and 58 is actuated by the drive hydraulic pressure, and the fourth and fifth friction elements 64 and 70 is actuated by the torque control hydraulic pressure. Accordingly, the third-fifth speed skip shift is accomplished by the hydraulic circuit as shown in FIG. 15. when completing the third-fifth speed skip shift, the second solenoid valve S2 is controlled to be turned ON by the transmission control unit.

By this control, since the hydraulic pressure with in the pressure detecting chamber 336 of the third-fourth speed shift valve 46 is exhausted, the valve spool 340 is moved leftward by the hydraulic pressure acting on the right face of the first land 338.

As a result, the fourth and fifth ports 328 and 330 of the third-fourth speed shift valve 46 are to communicate with each other, such that the drive hydraulic pressure standing by the fourth port 328 is supplied to the fourth and fifth ports 64 and 70 to convert the torque control hydraulic pressure into the drive hydraulic pressure.

When the speed change is completed, the sixth solenoid valve S6 is controlled to be turned OFF by the transmission control unit to exhaust the torque control hydraulic pressure flowing along the second torque control hydraulic pressure passage 40. And at the same time, the fifth solenoid valve S5 is controlled to regulate the line pressure while controlling the seventh solenoid valve S7 to be turned OFF.

"REVERSE "R" RANGE"

When the shift lever is selected at the reverse "R" range, the line pressure within the passage 8a, which is supplied to the manual valve 30, is supplied to the reverse pressure passage 76 and the drive hydraulic pressure which is supplied to the drive hydraulic pressure passage is interrupted.

As a result, the drive hydraulic pressure supplied to the first shift control part 32 is released, and the reverse pressure flowing along the reverse pressure passage 76 is directly supplied to the reverse friction element 74 to actuate the reverse friction element 74.

At this point, the solenoid valve S7 is controlled with low duty ratio by the transmission control unit to supply the hydraulic pressure, which is supplied to the solenoid supply valve 18 along the passage 8 and is reduced, to pressure detecting chamber 446 of the reverse clutch inhibitor valve 26. This hydraulic pressure acts on the right face of the first land 448 of the valve spool 444.

By this control, the valve spool 44 of the reverse clutch inhibitor valve 26 is to move leftward to communicate the first port 430 with the second port 434. As a result, the reverse pressure is supplied to the passage 426 through the second port 434.

Figure 16:
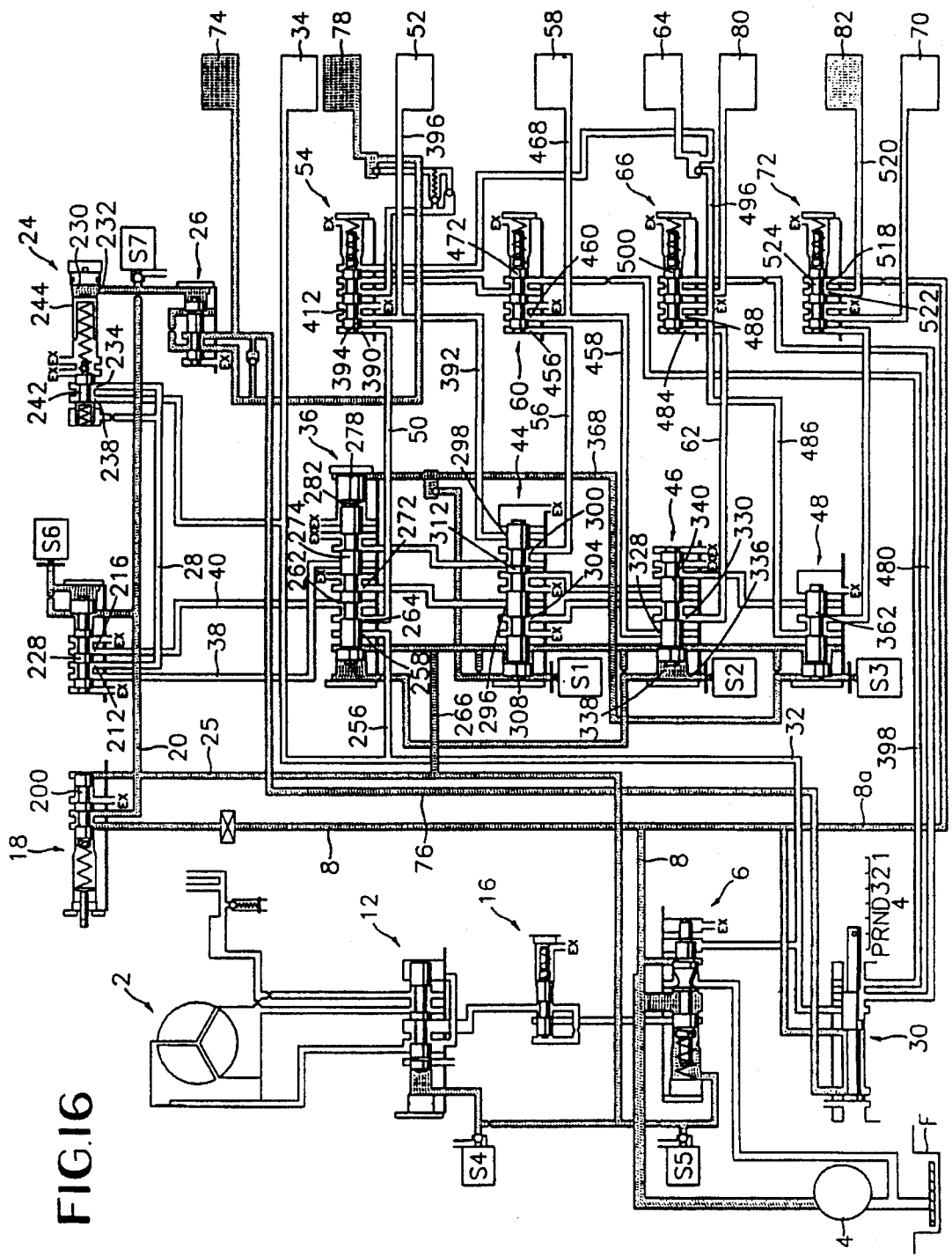
FIG. 16 is the hydraulic circuit diagram showing a formation of the hydraulic pressure at a reverse "R" range of the hydraulic control system for the automatic transmission according to the present invention.

The reverse pressure flowing along the passage 426 is supplied to the sixth friction element 78 through the shuttle valve 428 to actuate the sixth friction element, thereby forming the hydraulic path as shown in FIG. 16.

At this point, the fifth solenoid valve S5 is controlled by the transmission control unit to regulator the line pressure higher than the drive hydraulic pressure.

Further, a portion of the reverse pressure flowing along the passage 8a is supplied to the third port 518 of the overdrive unit valve 72 and then to the eighth friction element 82 along the passage 520 through the fourth port 522 communicating with the third port 518, thereby reversing the vehicle. The operation of the power will be described in below at this state.

That is, the rotating power transmitted from the engine to the input shaft X1 rotates the reverse sun gear shaft 604 by the actuation of the reverse friction element 74. And, the rotation power of the sun gear shaft is transmitted to the sun gear 624 of the second planetary gear unit 608 to rotate it in the clockwise direction.

As a result, the planet gear which is in mesh with the sun gear 624 rotates in counter-clockwise direction, at this point, since the carrier 628 can not rotate by the one-way clutch F2, the annulus gear 618 rotates in the counter-clockwise direction.

The rotating power of the annulus gear 618 is transmitted to the output drum 622 to rotate the drive sprocket 620 in the counter-clockwise direction.

At this point, although the carrier 616 fixed to the output drum 622 rotates so that the planet gear 612 of the first planetary gear unit 606 comes to rotate and thereby rotates the annulus gear 614, since the sixth friction element 78 is actuated, the annulus gear 614 can not rotate.

The reverse power transmitted to the drive sprocket 620 rotates the driven sprocket 632 of the subtransmission part in the same direction as that of the drive sprocket 620 by means of the chain member 634.

Accordingly, since the driven sprocket 632 is connected to the carrier 644 of the third planetary gear unit 636, the carrier 644 rotates in the counterclockwise direction and thereby the planet gear 642 rotates.

At this point, although the sun gear 640 which is in mesh with the planet gear 642 has rotating power in the counter-clockwise direction, the sun gear can not rotate by the fifth friction element 82 such that the third planetary gear unit 636 bodily rotates and transmits the rotation to the final reduction planetary gear unit 648 to accomplish the final reduction. This rotation is transmitted to the differential system 652 to revers the vehicle.

"PARKING "P" RANGE"

Figure 17:
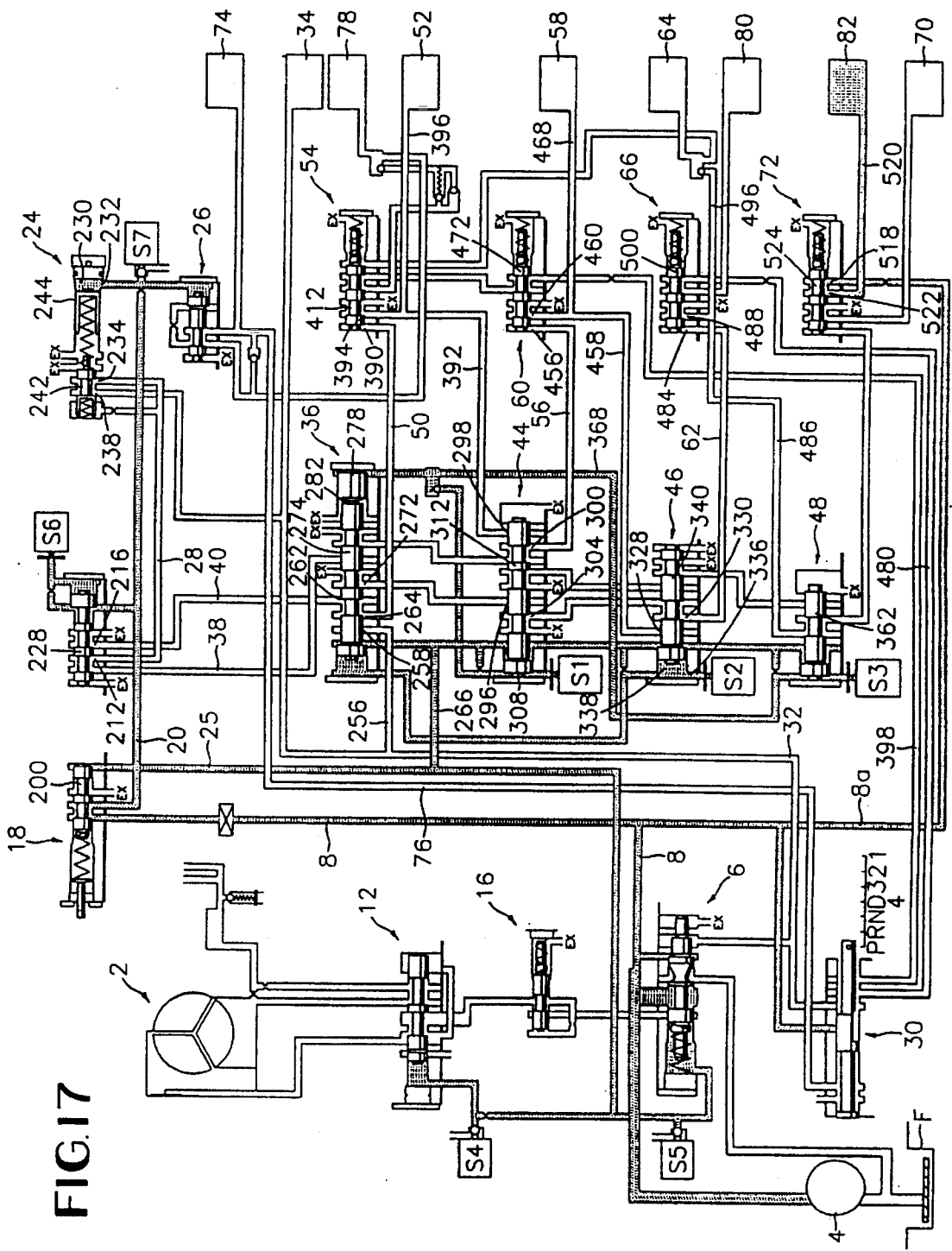
FIG. 17 is the hydraulic circuit diagram showing a formation of the hydraulic pressure at a parking "P" range of the hydraulic control system for the automatic transmission according to the present invention.

When the shift lever is selected at the parking "P" range, the line pressure supplied to the manual valve 30 is interrupted to avoid being supplied to the drive hydraulic pressure passage 32 and the reverse pressure passage 76 as shown in FIG. 17. That is, the line pressure are exhausted at the manual valve 30.

Although a portion of the line pressure flows into the overdrive unit valve 72 through the third port 518 and then is supplied to the eighth friction element 82 along the passage 520 through the fourth port 522, this hydraulic pressure does not give an effect on the transmission of power.

As a result, the driving power of the engine is not transmitted to the input shaft X1. However, since the vehicle may move by itself on a slant, a parking sprag gear G is formed on the output flange 646 which connects the final reduction planetary gear unit 648 to the third planetary gear unit 636 and a sprag is coupled with the sprag gear G to prevent the vehicle for moving as shown in FIG. 3.

As described above, when the shift lever is selected at the drive "D" range, fourth or fifth speed is accomplished by controlling the overdrive switch with ON/OFF. When the shift lever is selected at "3" range, the line pressure flows from the manual valve 30 along the passage 480, a portion of the line pressure flows along the drive hydraulic pressure passage 32 and actuates the friction elements in accordance with transmission control unit as shown in FIG. 18.

That is, at the first speed of "3" range, the first, seventh, and eighth friction elements 34, 80 and 82 are actuated, at the second speed of "3" range, the first, second, seventh and eighth friction elements 34, 52, 80 and 82 are actuated, and at the third speed of "3" range, the first, second, third, seventh and eighth friction elements are actuated.

Further, when the shift lever is selected at "2" range, hydraulic pressure is supplied to the third speed clutch valve 60 along the passage 398 and drive hydraulic pressure is supplied to the first and second shift control part D and E, such that at the first speed, the first, sixth, seventh and eighth friction elements 34, 78, 80 and 82 are actuated, and at the second speed, the first, second, fourth, seventh and eighth friction elements 34, 52, 64 and 80 are actuated.

When the shift lever is selected at "U" range, the vehicle is driven on with the first speed.

Accordingly, in the hydraulic control system of the present invention, when a driver shifts the shift lever between "L" "2" "3" and "D" ranges, the same effect as that of the manual transmission is obtained.

Further, if the transmission control unit malfunctions, since the first, second, and third solenoid valves S1, S2 and S3 are to be turned OFF, the vehicle travels with third speed.

The present invention further provides the reverse clutch inhibitor valve 26 as fail safety means for preventing the vehicle from reversing when the reverse range is selected by the driver's fault during travelling. This is achieved by the seventh solenoid valve S7 which is controlled to be turned ON/OFF by the transmission control unit.

As described above, if the seventh solenoid valve is controlled with high duty ratio, the hydraulic pressure within the pressure detecting chamber 446 of the reverse clutch inhibitor valve 26 is exhausted, whereby a portion of the hydraulic pressure flowing into the reverse clutch inhibitor valve 26 from the passage 76 through the first port 430 flows into the fourth port 440 through the bypass passage 436. This hydraulic pressure acts on the left face of the first land 448 so as to move the valve spool 44 rightward.

As a result, the third land 452 closes the second port 434 so that the hydraulic pressure supplied from the reverse pressure passage 76 can not supplied to the sixth friction element 78 along the passage 426, whereby the vehicle does not revers even when the shift lever is selected at the reverse "R" range.

As described above, the hydraulic control system according to the present invention has advantages of improving the shift feeling as well as the fuel consumption ratio by properly controlling the line pressure in accordance with the travelling condition to minimize the drive loss of the oil pump and reducing the shift impacht by switching the speed change with the drive hydraulic pressure after switch the speed change with the torque control hydraulic pressure.

Further, the hydraulic control system can improve the response to the speed change since the skip shift is possible.

The hydraulic control system provides the fail safety means for preventing the vehicle from reversing.

Although preferred embodiments of the present invention have been described in detail hereinabove, it should be clearly understood that many variations and/or modifications of the basic inventive concepts herein taught which may appear to those skilled in the pertinent art will still fall within the spirit and scope of the appended claims.

What is claimed is:

1. A hydraulic control system of an automatic transmission for a vehicle, comprising:

an oil pump for generating a hydraulic pressure;

a pressure regulating valve for receiving the hydraulic pressure from the oil pump and for properly regulating the hydraulic pressure at drive "D" or reverse "R" ranges;

a torque converter, which includes a damper clutch valve, for transmitting driving power from an engine to an input shaft of the transmission;

a converter clutch regulator valve for supplying the hydraulic pressure to the damper clutch to actuate the damper clutch;

a solenoid supply valve for reducing and supplying the hydraulic pressure, which is regulated at the pressure regulating valve, to first, second, third, fourth, fifth, sixth and seventh solenoid valves;

a first friction element which is actuated at all speed ratios and second, third, fourth, fifth, sixth, seventh and eight friction elements more than one of which is actuated at each speed ratio;

a torque control regulator valve for converting the hydraulic pressure into a torque control hydraulic pressure for actuating the friction elements for each speed ratio;

a control switch valve for receiving the torque control hydraulic pressure from the torque control regulator valve and for changing a flowing direction of the torque control hydraulic pressure;

first-second, second-third, third-fourth, and fourth-fifth speed shift valves for selectively supplying the torque control hydraulic pressure supplied from the control switch valve or a drive hydraulic pressure regulated by the pressure regulating valve to the friction elements for each speed ratio in accordance with ON/OFF operation of the first, second and third solenoid valves to change the speed ratio;

second speed clutch, third speed clutch, a fourth speed band, and an overdrive unit valves, all of which are controlled by the torque control hydraulic pressure and the drive hydraulic pressure, for supplying the hydraulic pressure to the friction elements for each speed ratio and the shift valves; and a manual valve for supplying the hydraulic pressure regulated by the pressure regulating valve to the shift valves or a reverse friction element.

2. The hydraulic control system of claim 1 in which the reverse friction element is directly connected to the manual valve via a reverse pressure passage to receive the hydraulic pressure in accordance with a position of a shift lever.

3. The hydraulic control system of claim 2 in which the system further comprises a reverse clutch inhibitor valve for preventing the vehicle from reversing by interrupting the hydraulic pressure which is supplied to the sixth friction element when the shift lever is shifted to a reverse "R" range during driving, the inhibitor valve being mounted on the reverse pressure passage.

4. The hydraulic control system of claim 1 in which the torque control regulator valve comprises a pressure detecting chamber to which the hydraulic pressure is supplied in accordance with the seventh solenoid valve controlled with duty ratio; a valve plug on which the hydraulic pressure within the pressure detecting chamber acts; a valve spool for selectively control the torque control hydraulic pressure which is supplied to the control switch valve; a first elastic member which is located between the valve spool and the valve plug to elastically support the valve spool and the valve plug; and a second elastic member, which has a smaller elastic force than that of the first elastic member, for elastically supporting the valve spool.

5. The hydraulic control system of claim 1 in which the torque control regulator valve is connected to the control switch valve via a first torque control hydraulic pressure passage and the torque control switch valve is connected to the first-second speed shift valve via second and third torque control hydraulic pressure passages to selectively supply the hydraulic pressure to the first-second speed shift valve in accordance with ON/OFF operation of the solenoid valve.

6. The hydraulic control system of claim 1 in which the first-second speed shift valve is provided with the first and second ports for selectively receiving the torque control hydraulic pressure; a third for directly receiving the drive hydraulic pressure from the manual valve port; a fourth port for supplying the torque control hydraulic pressure of the first port to the second-third speed shift valve; a fifth port for supplying the torque control hydraulic pressure of the second port to the second-third speed shift valve; and a sixth port for receiving the drive hydraulic pressure from the manual valve through the third port or for supplying the torque control hydraulic pressure of the first port to the second speed clutch valve, and the first-second speed shift valve comprises a valve spool for selectively opening the ports.

7. The hydraulic control system of claim 1 in which the second-third speed shift valve is provided with first and second ports for respectively receiving the hydraulic pressure from the first-second speed shift valve; a third port for receiving the hydraulic pressure from the second speed clutch valve; fourth and fifth ports for supplying the torque control hydraulic pressure flowing into through the first and second ports to the third-fourth speed shift valve; and a sixth port for supplying the torque control hydraulic pressure or the drive hydraulic pressure supplied from the third port to the third speed clutch valve, and the secondthird speed shift valve comprises a valve spool for selectively opening the ports.

8. The hydraulic control system of claim 1 in which the third-fourth speed shift valve is provided with first and second ports for respectively receiving the hydraulic pressure from the second-third speed shift valve; a third port for receiving the hydraulic pressure from the third speed clutch valve, fourth and fifth ports for respectively supplying the torque control hydraulic pressure flowing into through the first and second ports to the fourth-fifth speed shift valve; and a sixth port for supplying the hydraulic pressure of the first and third ports to the fourth speed band valve, and the third-fourth speed shift valve comprises a valve spool for selectively opening the ports.

9. The hydraulic control system of claim 1 in which the fourth-fifth speed shift valve is provided with first and second ports for receiving the hydraulic pressure from the third-fourth speed shift valve; a third port for receiving the hydraulic pressure from the fourth speed band valve; and a fourth for supplying the hydraulic pressure to the overdrive unit valve, and the fourth-fifth speed shift valve comprises a valve spool for selectively opening the ports.

10. The hydraulic control system of claim 1 in which the first-second speed shift valve comprises first and second pressure detecting chambers, the second-third speed shift valve comprises a third pressure detecting chamber, the third-fourth speed shift valve comprises a fourth pressure detecting chamber, and the fourth-fifth speed shift valve comprises a fifth pressure detecting chamber, wherein the hydraulic pressure within the third pressure detecting chamber is controlled by the first solenoid valve, each hydraulic pressure of the first and fourth pressure detecting chambers is controlled by the second solenoid valve, and each hydraulic pressure of the second and fifth pressure detecting chambers is controlled by the third solenoid valve, whereby the torque control hydraulic pressure and the drive hydraulic pressure is supplied to the friction elements for each speed ratio in due sequence.

11. The hydraulic control system of claim 1 in which the manual valve comprises parking "L", reverse "R" neutral "N" drive "D" "3" "2" and low "U"

12. The hydraulic control system of claim 11 in which the manual valve is constituted such that a manual transmission between the drive "D" "3" "2" and low "L" ranges is possible.

13. The hydraulic control system of claim 12 in which the drive hydraulic pressure is directly supplied to the first and eight friction element at the first speed of the drive "D" range.

14. The hydraulic control system of claim 12 in which, at the second speed of the drive "D" range,the third solenoid valve, which controls the first-second speed shift valve, is controlled to be turned OFF to supply the drive hydraulic pressure to the second friction element as well as the first and eighth friction elements which actuate at the first speed of the drive "D" range.

15. The hydraulic control system of claim 12 in which, at the third speed of the drive "D" range, the first solenoid valve, which controls the second-third speed shift valve, is controlled to be turned OFF to supply the drive hydraulic pressure to the third friction element as well as the first, second and eighth friction elements which actuate at the second speed of the drive "D" range.

16. The hydraulic control system of claim 12 in which, at the fourth speed of the drive "D" range, the second valve, which controls the third-fourth speed shift valve, is controlled to be turned ON to supply the drive hydraulic pressure to the fourth friction element as well as the first, second, third and eighth friction elements which actuate at the third speed of the drive "D" range.

17. The hydraulic control system of claim 12 in which, at the fifth speed of the drive "D" range, the third solenoid valve, which controls the first-second speed shift valve, is controlled to be turned ON to interrupt the hydraulic pressure which is supplied to the eighth friction element and to supply the drive hydraulic pressure to the fifth friction element as well as the first, second, third and fourth friction elements which actuate at the fourth speed of the drive "D" range.

18. The hydraulic control system of claim 1 in which the solenoid supply valve comprises an elastic member, a valve spool elastically supported by the elastic member, and a screw for compressing and expanding the elastic member to regulate the hydraulic pressure.

19. The hydraulic control system of claim 10 in which the second detecting chamber of the first-second speed shift valve is connected to the second and third solenoid valve through first and second passages, respectively, and a shuttle valve is mounted on a connecting portion of the first and second passages to provide a skip shift.

20. The hydraulic control system of claim 10 in which, when the speed ratio is skip-shifted from the second speed to the fourth speed skip, the first and second solenoid valves which control the second-third and third-fourth speed shift valves, respectively, are controlled to be turned on and the third solenoid valve which controls the fourth-fifth and first-second speed shift valves is controlled to be turned OFF, such that the drive hydraulic pressure is supplied to the first, second, and eight friction elements and the torque control hydraulic pressure is supplied to the third and fourth friction elements.

21. The hydraulic control system of claim 10 in which, when the speed ratio is skip-shifted from the second speed to the fifth speed, the first, second, third solenoid valves are controlled to be turned ON such that the drive hydraulic pressure is supplied to the first and second friction elements and the torque control hydraulic pressure is supplied to the third, fourth and fifth friction elements.

22. The hydraulic control system of claim 10 in when the speed ratio is skip-shifted from the third speed to the fifth speed, the first and second solenoid valves which control the second-third speed shift and third-fourth speed shift valves, respectively, are controlled to be turned OFF and the third solenoid valve, which controls the fourth-fifth and first-second speed shift valves, is controlled to be turned ON, such that the drive hydraulic pressure is supplied to the first, second and third friction element and the torque control hydraulic pressure is supplied to the fourth and fifth friction elements.

23. A hydraulic control system of an automatic transmission for a vehicle, comprising:

a damper clutch control part including:

a pressure regulating valve for regulating hydraulic pressure generated in an oil pump in accordance with a load of the vehicle; and a converter clutch regulator valve having a valve spool which is moved by a first solenoid valve;

a torque control hydraulic pressure control part including:

a torque control regulator valve for controlling the hydraulic pressure which can actuating friction elements: and a control switch valve for supplying the hydraulic pressure controlled by the torque control regulator valve to the friction elements;

a first shift control part including:

a manual valve for changing a flow direction of the hydraulic pressure in accordance with a position of a shift lever; and first-second, second-third, third-fourth and fourth-fifth speed shift valves for supplying a torque control hydraulic pressure supplied from the control switch valve or a drive hydraulic pressure supplied to the manual valve to the friction elements in accordance with ON/OFF operations of second, third and fourth solenoid valves; and a second shift control part for directly supplying the torque control hydraulic pressure or the drive hydraulic pressure, which is supplied from the shift valves, to the friction elements.

24. The hydraulic control system of claim 23 in which the first-second speed shift valve is provided with the first and second ports for selectively receiving the torque control hydraulic pressure; a third for directly receiving the drive hydraulic pressure from the manual valve port; a fourth port for supplying the torque control hydraulic pressure of the first port to the second-third speed shift valve; a fifth port for supplying the torque control hydraulic pressure of the second port to the second-third speed shift valve; and a sixth port for receiving the drive hydraulic pressure from the manual valve through the third port or for supplying the torque control hydraulic pressure of the first port to the second speed clutch valve, and the first-second speed shift valve comprises a valve spool for selectively opening the ports.

25. The hydraulic control system of claim 23 in which the second-third speed shift valve is provided with first and second ports for respectively receiving the hydraulic pressure from the first-second speed shift valve; a third port for receiving the hydraulic pressure from the second speed clutch valve; fourth and fifth ports for supplying the torque control hydraulic pressure flowing into through the first and second ports to the third-fourth speed shift valve; and a sixth port for supplying the torque control hydraulic pressure or the drive hydraulic pressure supplied from the third port to the third speed clutch valve, and the secondthird speed shift valve comprises a valve spool for selectively opening the ports.

26. The hydraulic control system of claim 23 in which the third-fourth speed shift valve is provided with first and second ports for respectively receiving the hydraulic pressure from the second-third speed shift valve; a third port for receiving the hydraulic pressure from the third speed clutch valve, fourth and fifth ports for respectively supplying the torque control hydraulic pressure flowing into through the first and second ports to the fourth-fifth speed shift valve; and a sixth port for supplying the hydraulic pressure of the first and third ports to the fourth speed band valve, and the third-fourth speed shift valve comprises a valve spool for selectively opening the ports.

27. The hydraulic control system of claim 23 in which the fourth-fifth speed shift valve is provided with first and second ports for receiving the hydraulic pressure from the third-fourth speed shift valve; a third port for receiving the hydraulic pressure from the fourth speed band valve; and a fourth for supplying the hydraulic pressure to the overdrive unit valve, and the fourth-fifth speed shift valve comprises a valve spool for selectively opening the ports.

28. The hydraulic control system of claim 23, the fist-second speed shift valve includes a valve spool having six lands, the second-third speed shift valve includes a valve spool having five lands, the third-fourth speed shift valve incudes a valve spool having four lands, and the fourth-fifth speed shift valve includes a valve spool having three lands.

* * * * *

UNITED STATES PATENT AND TRADEMARK OFFICE
CERTIFICATE OF CORRECTION

PATENT NO. : 5,507,706
DATED : April 16, 1996
INVENTOR(S) : Jang et al.

It is certified that error appears in the above-indentified patent and that said Letters Patent is hereby corrected as shown below:

Please insert the foreign application priority information as shown below:

Item: [30]   Foreign Application Priority Data

June 17, 1993   [KR]   Korea............... 93 - 11131

June 22, 1993   [KR]   Korea............... 93 - 11419

June 22, 1993   [KR]   Korea............... 93 - 11418

June 22, 1993   [KR]   Korea............... 93 - 11420

June 22, 1993   [KR]   Korea............... 93 - 11421

Signed and Sealed this

Sixteenth Day of July, 1996

Attest:

BRUCE LEHMAN

*Attesting Officer*                     *Commissioner of Patents and Trademarks*